United States Patent
Diamand et al.

(10) Patent No.: US 11,422,939 B2
(45) Date of Patent: Aug. 23, 2022

(54) SHARED READ—USING A REQUEST TRACKER AS A TEMPORARY READ CACHE

(71) Applicant: Intel Corporation, Santa Clara, CA (US)

(72) Inventors: Israel Diamand, Aderet (IL); Ravi K. Venkatesan, Bangalore (IN); Shlomi Shua, Tel Aviv (IL); Oz Shitrit, Tel Aviv (IL); Michael Behar, Zichron Yaakov (IL); Roni Rosner, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 16/727,657

(22) Filed: Dec. 26, 2019

(65) Prior Publication Data
US 2021/0200675 A1    Jul. 1, 2021

(51) Int. Cl.
*G06F 12/00* (2006.01)
*G06F 12/084* (2016.01)
*G06F 12/126* (2016.01)

(52) U.S. Cl.
CPC .......... *G06F 12/084* (2013.01); *G06F 12/126* (2013.01); *G06F 2212/604* (2013.01); *G06F 2212/622* (2013.01)

(58) Field of Classification Search
CPC ................ G06F 12/084; G06F 12/126; G06F 2212/604; G06F 2212/622
See application file for complete search history.

(56) References Cited

U.S. PATENT DOCUMENTS

| | | | |
|---|---|---|---|
| 9,904,619 B2* | 2/2018 | Shiota | G06F 13/161 |
| 2007/0226422 A1* | 9/2007 | Mino | G06F 12/0862 |
| | | | 711/137 |
| 2011/0276758 A1* | 11/2011 | Garmiza | G06F 3/0659 |
| | | | 711/114 |
| 2012/0324144 A1* | 12/2012 | Jacobs | G06F 12/1009 |
| | | | 711/6 |
| 2013/0097394 A1* | 4/2013 | Hatula | G06F 13/1663 |
| | | | 711/154 |
| 2015/0268963 A1* | 9/2015 | Etsion | G06F 9/3851 |
| | | | 712/225 |
| 2020/0133569 A1* | 4/2020 | Damgar | G06F 3/0683 |

* cited by examiner

*Primary Examiner* — Shawn X Gu
*Assistant Examiner* — Mohammad S Hasan
(74) *Attorney, Agent, or Firm* — Nicholson De Vos Webster & Elliott, LLP

(57) ABSTRACT

Disclosed embodiments relate to a shared read request (SRR) using a common request tracker (CRT) as a temporary cache. In one example, a multi-core system includes a memory and a memory controller to receive a SRR from a core when a Leader core is not yet identified, allocate a CRT entry and store the SRR therein, mark it as a Leader, send a read request to a memory address indicated by the SRR, and when read data returns from the memory, store the read data in the CRT entry, send the read data to the Leader core, and await receipt, unless already received, of another SRR from a Follower core, the other SRR having a same address as the SRR, then, send the read data to the Follower core, and deallocate the CRT entry.

17 Claims, 24 Drawing Sheets

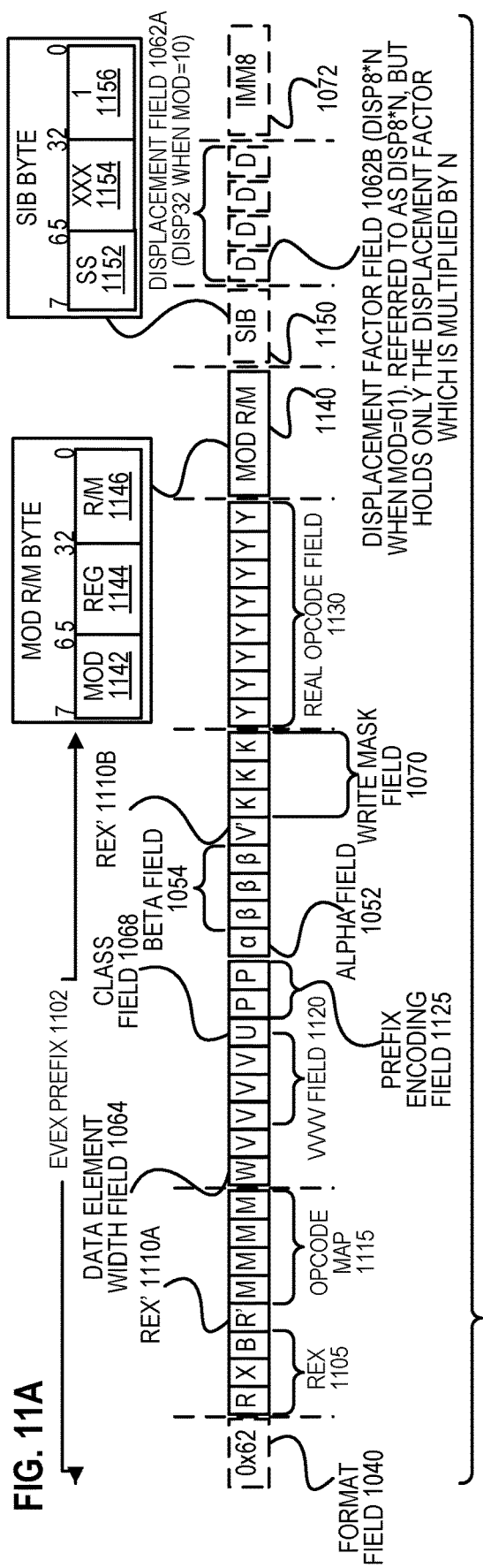
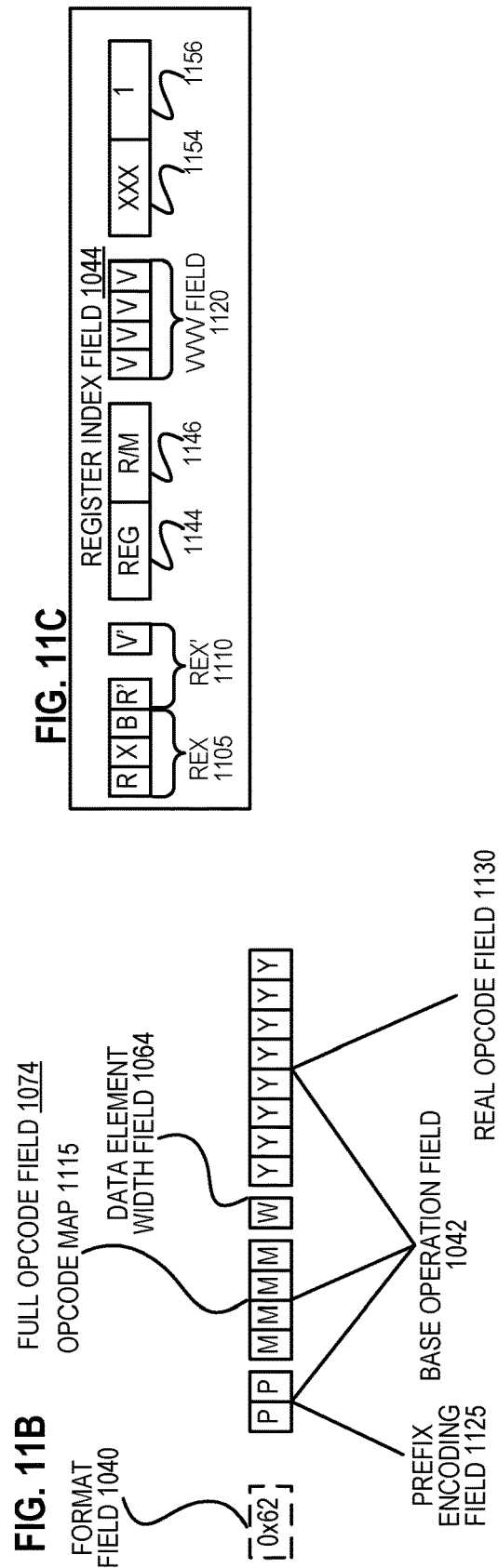

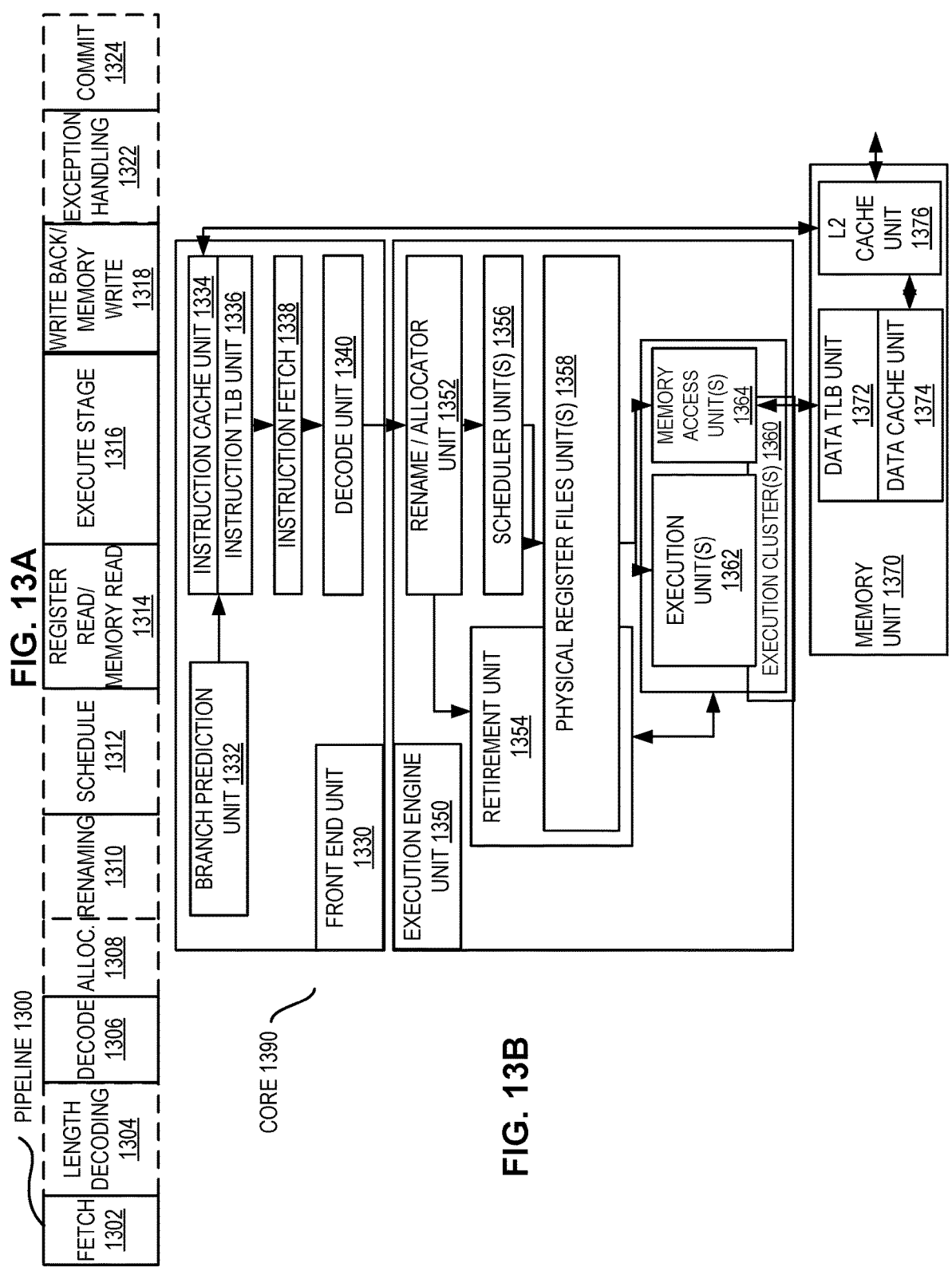

SHARED READ—USING A REQUEST TRACKER AS A TEMPORARY READ CACHE

FIELD OF THE INVENTION

The field of invention relates generally to computer processor architecture, and, more specifically, to a shared read with an improved method of using a request tracker as a temporary cache.

BACKGROUND

Deep learning is part of a broader family of machine learning methods based on artificial neural networks, and has been applied to fields including computer vision, speech recognition, natural language processing, audio recognition, social network filtering, machine translation, bioinformatics, drug design, medical image analysis, material inspection and board game programs, where it has produced results comparable to and in some cases superior to human experts.

In modern data centers, operating in the context of deep learning and otherwise, computing systems typically include two or more processor cores (or simply, cores) that are sometimes integrated onto a single die, forming a system on a chip (SoC). Two or more cores can be connected to the SoC fabric (as used herein, the SoC fabric is the SoC interconnect that connects different components, such as the cores, the caches, and memory) through a shared port, such as a memory read port or a cache read port. Frequently, two or more cores are running the same application, with some common data and some distinct data. For example, in a deep learning algorithm-based ion an artificial neural network, multiple cores can run the same application code using the same weights but on distinct input data.

In such an example, the cores use a shared SoC port (e.g., memory read port) in order to read and write from the system memory (or a cache). Some parts of the input data are shared between the cores (e.g. the application code and some parameters or weights), while other parts (e.g., input data) are different.

Unfortunately, when the two or more cores are running independently and not having a shared cache, each of them must read the shared data from the SoC independently, so the same data is being read twice at the cost of unnecessary power and bandwidth utilization.

BRIEF DESCRIPTION OF THE DRAWINGS

The present invention is illustrated by way of example and not limitation in the figures of the accompanying drawings, in which like references indicate similar elements and in which:

FIG. 10A is a block diagram illustrating a generic vector friendly instruction format and class A instruction templates thereof according to some embodiments of the invention;

FIG. 10B is a block diagram illustrating the generic vector friendly instruction format and class B instruction templates thereof according to some embodiments of the invention;

FIG. 11A is a block diagram illustrating an exemplary specific vector friendly instruction format according to some embodiments of the invention;

FIG. 11B is a block diagram illustrating the fields of the specific vector friendly instruction format that make up the full opcode field according to one embodiment;

FIG. 11C is a block diagram illustrating the fields of the specific vector friendly instruction format that make up the register index field according to one embodiment;

FIG. 13A is a block diagram illustrating both an exemplary in-order pipeline and an exemplary register renaming, out-of-order issue/execution pipeline according to some embodiments;

FIG. 13B is a block diagram illustrating both an exemplary embodiment of an in-order architecture core and an exemplary register renaming, out-of-order issue/execution architecture core to be included in a processor according to some embodiments;

FIG. 14A is a block diagram of a single processor core, along with its connection to the on-die interconnect network and with its local subset of the Level 2 (L2) cache, according to some embodiments;

FIG. 14B is an expanded view of part of the processor core in FIG. 14A according to some embodiments;

FIG. 16 shown a block diagram of a system in accordance with some embodiments;

FIG. 17 is a block diagram of a first more specific exemplary system in accordance with some embodiment;

FIG. 18 is a block diagram of a second more specific exemplary system in accordance with some embodiments;

FIG. 19 is a block diagram of a System-on-a-Chip (SoC) in accordance with some embodiments.

DETAILED DESCRIPTION OF THE EMBODIMENTS

Figure 1:
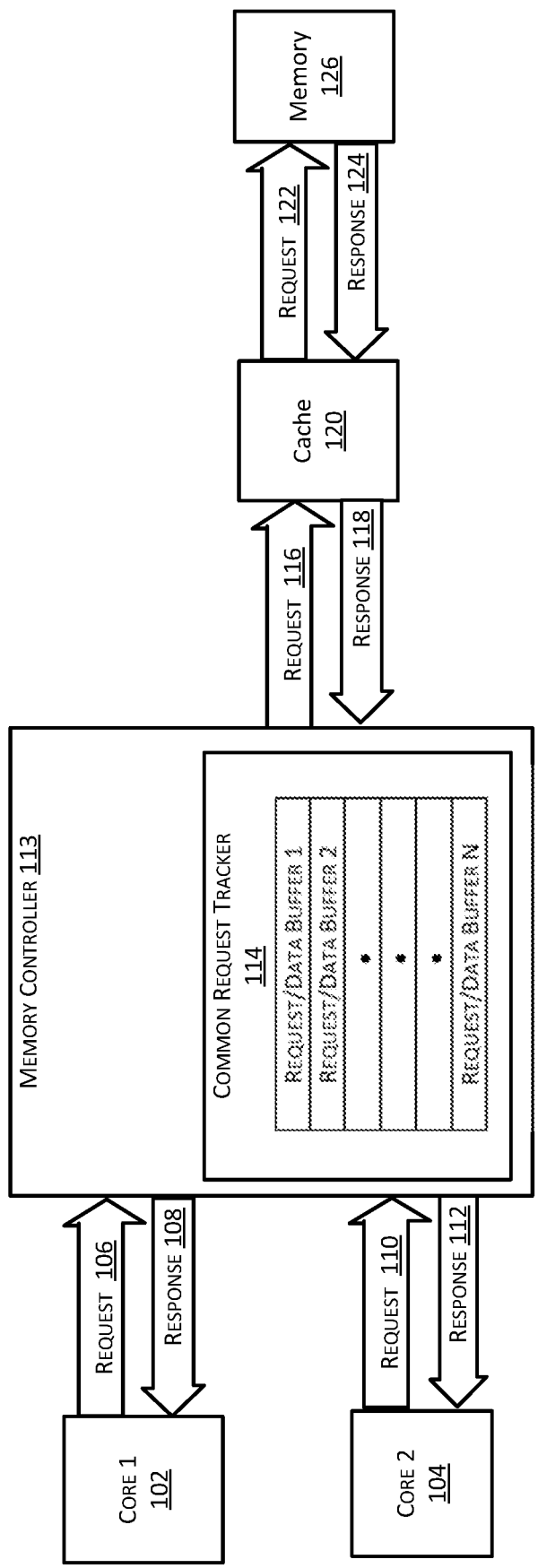
FIG. 1 is a block diagram illustrating a system for performing a shared read request using a request tracker as a temporary cache, according to some embodiments.

In the following description, numerous specific details are set forth. However, it is understood that some embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

As mentioned above, when multiple SoC cores operating independently access shared data, unnecessary, duplicate, inefficient memory accesses can result.

Embodiments of the invention disclosed herein make use of a common request tracker to temporarily store read data requested by a first core (the Leader core, or simply, the Leader) so that it can be shared with one or more other cores (the Follower cores, or, simply, the Followers), without requiring the Followers to make another memory request. In other words, a single read access will supply the data to multiple cores, and hence reducing the required SoC bandwidth and power.

In alternate, inferior approaches, a shared Mid-Level-Cache (MLC) is implemented. The MLC is shared between multiple cores, such that, after the first core is reading the data from the SoC, the data is placed in the cache, so that a second core can read the data from the cache, rather than to issue a read request to access the SoC. But such approaches are costly: having a shared cache is a too costly as a solution for this problem, since a cache requires a lot of area and complex management (e.g. associativity, allocation, and replacement policies). A cache is a good solution for data that is to reside in the cache for relatively a long time, while in the case of the Shared Read Requests described herein, data is only expected to be needed for one-time use and for a very short time. In addition, data in these accelerator applications/workloads are usually software managed, hence hardware managed cache is a heavy/complex solution and most probably not efficient.

In a typical SoC, the logic that handles the shared SoC port has a Common Request Tracker (CRT). Disclosed embodiments offer the cost-savings of making use of existing hardware: for example, the CRT is often an architecturally required component used for monitoring and maintaining the progress of regular, architectural reads and writes in a processor or SoC. In other words, the CRT, is expected to be included in a modern processor or SoC, and is suitable for being used by disclosed embodiments. In operation, the CRT can advantageously be used as a temporary cache. In a case of 'Shared Read', the CRT entry and the associated data buffer that is allocated for the first core read request is kept active until the second core read request of the same data, so the read data that was acquired by the first access is used also to satisfy the second access.

Disclosed embodiments offer several advantages, including the following: Performance improvement: the utilization of SoC fabric bandwidth that is used for the shared read data can be reduced by using the shared read request, as described herein. This bandwidth can be utilized by other requests, so overall performance is improved. In addition, the second reading core (i.e., the Follower) will get the read data faster than it would without using disclosed embodiments, since it does not require its own SoC access to get the data.

Power improvement: the reduction in SoC fabric bandwidth also provides a power reduction.

Area saving and design simplicity: many of the same benefits of a shared cache are achieved with minimal additional area and in a much simpler design.

Shared Read Usage Model

The Shared Read usage model assume that the 2 or more cores/accelerator have a massive amount of read-only data that is shared between those two cores, and that the software that runs on each core has the ability to identify this data. A 'Shared Read' attribute is asserted by the core along with the request, to notify the common Request Tracker that this read is shared.

Shared Read Implementation in the Common Request Tracker:

When servicing shared read requests from multiple cores, some embodiments define a Leader core as the core that makes faster progress in issuing shared read requests. The other core is defined as the Follower core. To implement such a policy, some such embodiments define the Leader core as the first one from which a shared read request is received. The Leader core remains the Leader until all of its shared read requests have been matched by corresponding shared read requests from the Follower.

The number of shared read requests that were issued by the Leader and were not yet matched by the Follower is defined as Current_Shared_Distance. The Current_Shared_Distance can be defined as the number of shared read requests received by the Leader minus the number received from the Follower. In one example, the Current_Shared_Distance is incremented on every Leader's request, and decremented on every Follower's request. In some embodiments, the Current_Shared_Distance is maintained as a global variable.

The Leader/Follower cores can switch during execution. If at a certain point Current_Shared_Distance is 0 (in the beginning of execution, or when all pending shared read request are matched), the core that issues the next shared read request becomes the Leader, and the other core becomes the Follower.

Table 1, below, shows a format of a common request tracker (CRT) entry, according to some embodiments. As shown, the CRT entry includes an opcode, which can indicate a write, read, or shared read request (SRR). The address field contains the physical address, and, as described below, can be used to identify a Leader and Follower(s) of a shared read. In some embodiments, the CRT entry includes a control field, which can specify whether to treat the corresponding request as a Leader or Follower, and how many Followers are involved. In other embodiments, the CRT entry includes more and different fields.

TABLE 1

| Opcode | Address | Data | Control |
|---|---|---|---|
| W/R/SR | Physical Address | Write or Read Data | |

Max Shared Distance:

Max_Shared_Distance" is a global parameter (usually configurable) that limits the maximum value of Current_Shared_Distance. Max_Shared_Distance prevents the Leader from taking all CRT entries. Since those entries are shared resources, the Follower should have a minimum number of entries in order to make progress (with Shared_Read and other requests), otherwise the system can hang.
Performance Considerations when Configuring Max Shared Distance Modifying Max Shared Distance can affect Performance: by limiting the ability of the Leader to run much ahead of the Follower. In some embodiments, Max_Shared_Distance is tuned dynamically during run time to attempt to maximize the frequency of both cores requiring the same data at about the same time, and hence increase the benefit of the disclosed embodiments. In other embodiments, Max_Shared_Distance is tuned as per application or per runtime conditions. In yet other embodiments, Max_Shared_Distance is optimized and set using experiments during manufacture.

In addition, if embodiments leave too few entries for the Follower to make progress, it can result in lower performance, so the overall system performance is reduced.
Implementation of Max Shared Distance In some embodiments, Max_Shared_Distance is implemented by blocking any additional shared read requests from the Leader (not allocating into CRT), if Current_Shared_Distance is equal to Max_Shared_Distance.
Shared Read Errors:

Disclosed embodiments define at least the following error conditions:
Timeout: when the Leader is blocked by Max_Shared_Distance, and the Follower does not issue shared read requests to close the distance, and
Shared_Read Mismatch Error—when a Shared_Read from the Follower does not match a pending request from the Leader.

These error conditions may indicate a software problem, for example when some requests were marked by mistake as a Shared_Read (or were not marked when needed, or, for example, the Leader and Follower cores may be running different applications. Error conditions may also arise due to hardware problems.

When an error occurs, some embodiments respond by doing one or more of the following: 1) Raise an error flag. 2) Reset all Shared_Read states in CRT to let the system running with no hang.

In one example, a multi-core system includes a memory and a memory controller to receive a shared read request (SRR) from a core when a Leader core is not yet identified. In response, the memory controller allocates a CRT entry and stores the SRR therein, marks it as a Leader, and sends a read request to a memory address indicated by the SRR. When read data returns from the memory, the memory controller stores the read data in the CRT entry, sends the read data to the Leader core, and await receipt, unless already received, of another SRR from a Follower core, the other SRR having a same address as the SRR. Then, the memory controller sends the read data to the Follower core, and deallocates the CRT entry. In so doing, the memory controller has advantageously obviated the need to issue another memory request for the Follower core.

FIG. 1 is a block diagram illustrating a system for performing a Shared Read Flow using a request tracker as a temporary cache, according to some embodiments. As shown, system 100 for executing a Shared Read Flow includes two cores 102 and 104, (or accelerators) connected, using connectors 106, 108, 110, and 112 to memory controller 113, which includes common request tracker (CRT) 114, and which is connected, using connectors 116 and 118, to cache 120, which is connected, using connectors 122 and 124, to memory 126. While CRT 114 is shown as being incorporated in memory controller 113, in other embodiments, CRT 114 is separate from and external to the memory controller. The CRT entries are dynamically allocated among the requestors. In some embodiments, a CRT entry holds the request attributes, like an opcode, an address, and control, and has a buffer to hold read data. In case of a regular (non-shared) read, the CRT entry is de-allocated as soon as the data is sent to the requesting core. In case of a shared read, the CRT entry of the first reader is held until the second request arrives and the data is sent to the second requestor. Some embodiments involve more than one Follower, and the control fields in the CRT entry indicates how many Follower cores—2, 3, 4, or more—are to receive copies of the data.

It should be noted that while the below description and the associated figures frequently use examples of systems with just two cores, the invention is not so limited. The ideas described can be extended to systems with more than two cores, or even systems with a large number of virtual machines. Execution of the Shared Read Flow is further illustrated and described with respect to FIGS. 2A-2C, 3-8, 13A-B, and 14A-B.

Figure 2A:
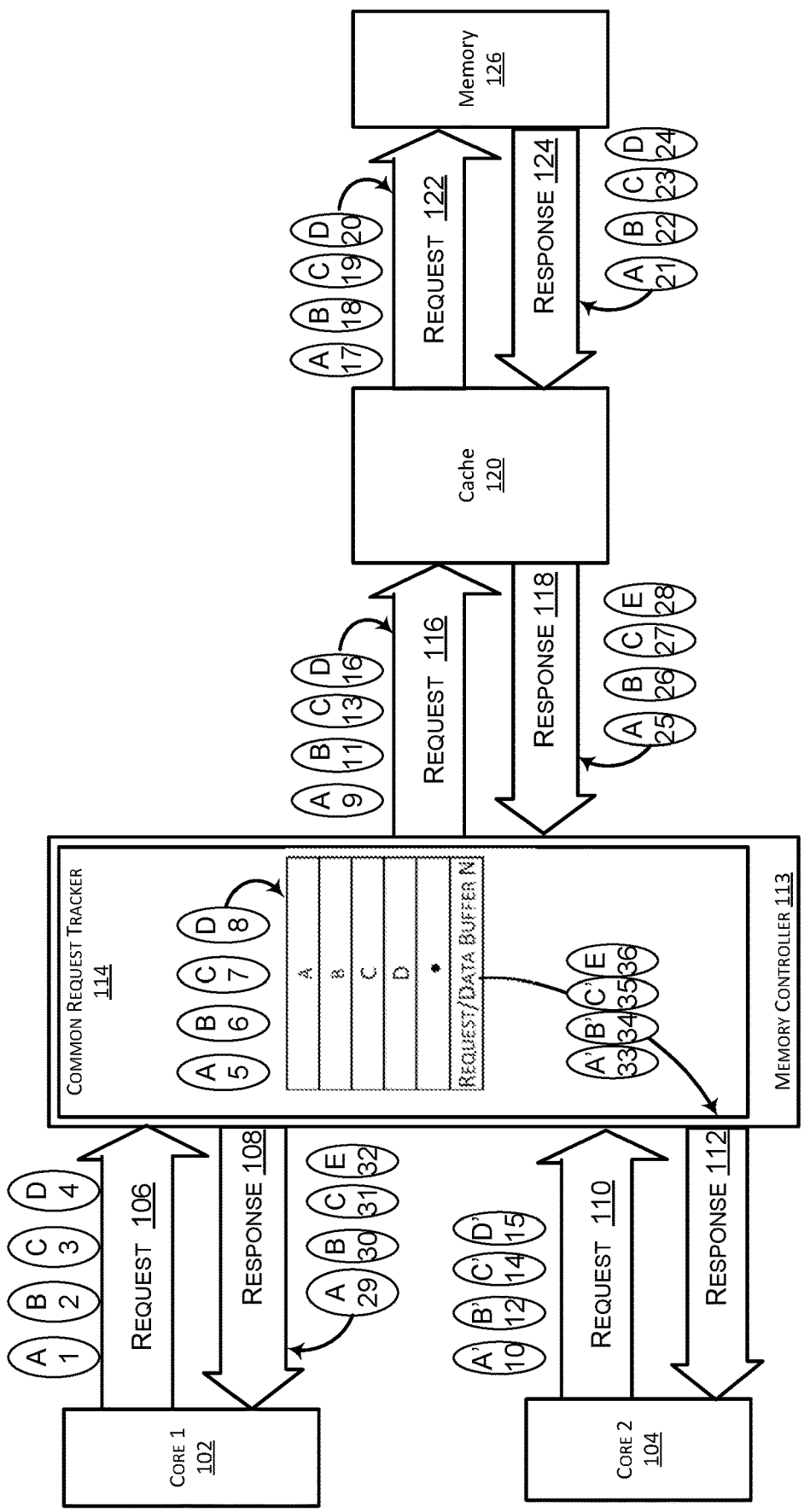
FIG. 2A is a block diagram illustrating an example of using a request tracker as a temporary cache while performing a shared read request, according to some embodiments.

FIG. 2A is a block diagram illustrating an example of using a request tracker as a temporary cache while performing a shared read request, according to some embodiments. As shown, using the same labels as in FIG. 1, system 100 for executing a Shared Read Flow includes two cores 102 and 104, (or accelerators) connected, using connectors 106, 108, 110, and 112 to memory controller 113, which includes common request tracker (CRT) 114, and which is connected, using connectors 116 and 118, to cache 120, which is connected, using connectors 122 and 124, to memory 126.

Also shown are individual data packets, represented as ellipses, each containing an address, specified by a capital letter, and a timestamp, relative to other data packets. Data packets traveling upstream represent shared read requests (SRRs), and those traveling downstream include read data. For example, the first packet to be sent is from core 1 102, to address "A," at relative timestamp 1.

In operation, memory controller 113 receives four shared read requests (SRRs) addressed to A, B, C, and D, from core 1 102 at times 1, 2, 3, and 4, when a Leader core is not yet identified. Memory controller 113 allocates four entries in common request tracker 114, and stores the SRRs therein.

In some embodiments, memory controller 113 treats core 1 102 as the Leader core because its first SRR to address A was received sooner, at time 1, than the SRR from core 2 104 to the same address, A, which was received at time 10. Note that core 1 102 and core 2 104 operate independently, and it is possible that the first SRR would have come from core 2 earlier than from core 1, in which case core 2 would have been treated as the Leader.

In some other embodiments, not shown here, each SRR received from core 1 102 and core 2 104 includes a control field specifying whether it is to be treated as Leader or Follower.

Other embodiments, also not shown here, include multiple Followers. For example, each SRR can include a control field specifying how many cores are to share the data. Say, for example, each SRR includes a control field indicating 4 cores are to share the read data. In such a case, memory controller 113 would treat the first core from which it received an SRR as the Leader, and the other three cores as Followers. In a variation, each SRR can use the control field to indicate whether it is to be treated as a Leader or as a Follower, and can also indicate how many cores are to act as Followers to share data.

Returning to the discussion of FIG. 2A, though not shown, memory controller 113 takes notice and remembers that the four SRRs received at times 5, 6, 7, and 8, originated from Leader core 1 102, sets the share distance (e.g., Current_Shared_Distance) to one after storing the first SRR, and increments it after storing the next three SRRs.

Memory controller 113 then sends four read requests addressing A, B, C, and D at times 9, 11, 13 and 16 to cache 120. Shortly later, memory controller 113 receives SRRs addressing A, B, C, and D from core 2 104 at times 10, 12, 14, and 15. Cache 120, in turn, sends four requests addressing A, B, C. and D, to memory 124 at times 17, 18, 19, and 20. The read data, addressed by A, B, C, and D, returns from memory 124 to cache 120 at times 21, 22, 23, and 24, and from cache 120 to memory controller 113 at times 25, 26, 27, and 28. Memory controller 113 stores the read data into the CRT entries holding the SRRs to A, B, C, and D. The memory controller also returns the read data addressed by A, B, C, and D, to the Leader core 102 at times 29, 30, 31, and 32. At this point, the memory controller awaits receipt of the SRRs from the Follower, which in this case have already arrived, since they were sent at times 10, 12, 14, and 15.

Finally, illustrating an advantage provided by embodiments disclosed herein, the memory controller, instead of sending read requests from core 104 to the cache and to memory, sends the read data, which already resides in the CRT, to Follower core 104 at times 33, 34, 35, and 36. Thus, the CRT is used as a temporary cache to store read data. Though not shown, the memory controller can deallocate the CRT entries holding the SRRs addressing A, B, C, and D.

Figure 2B:
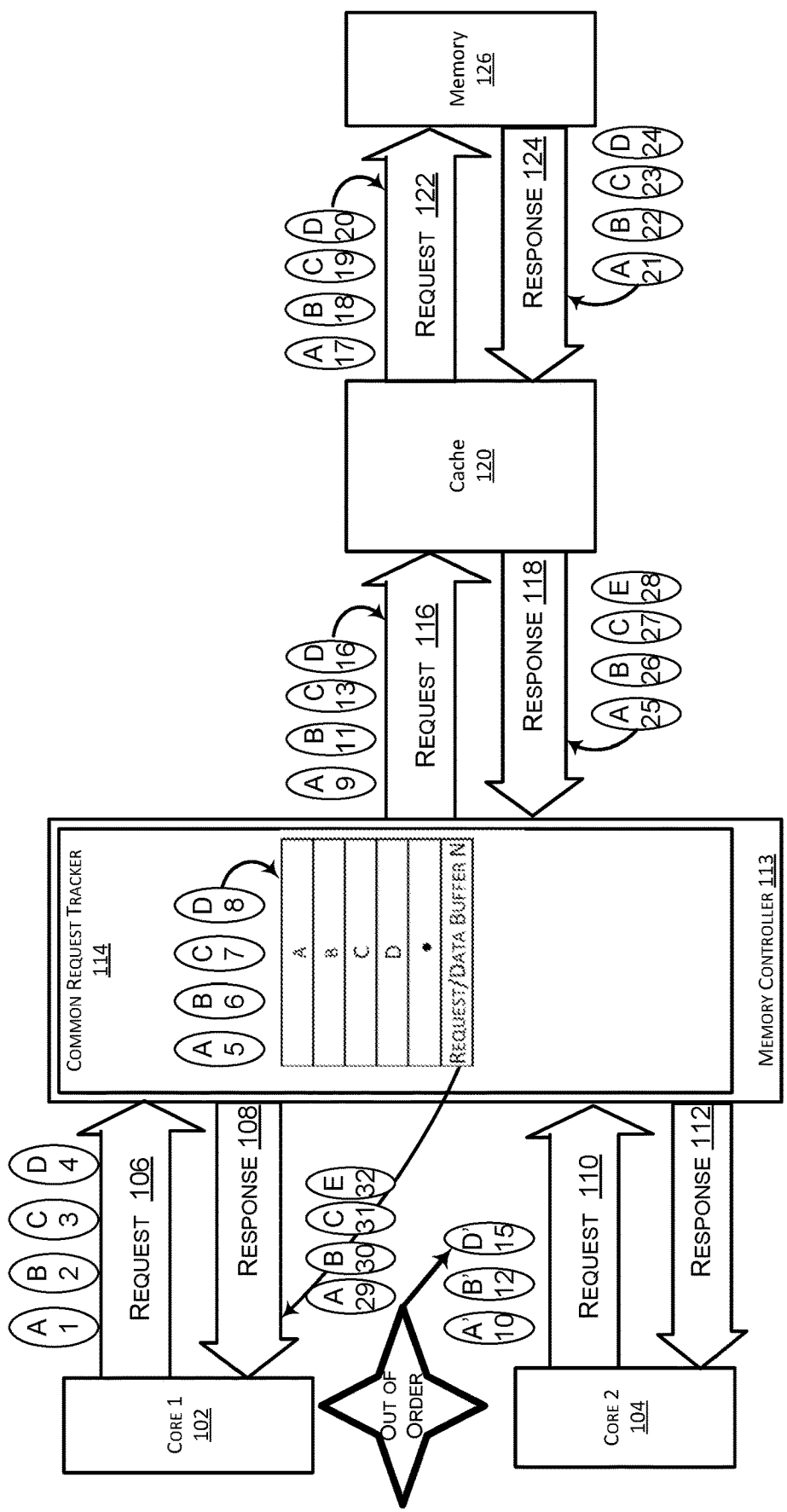
FIG. 2B is another block diagram exemplifying use of a request tracker as a temporary cache while performing a shared read request, according to some embodiments.

FIG. 2B is another block diagram exemplifying use of a request tracker as a temporary cache while performing a shared read request, according to some embodiments. As shown, using the same labels as in FIG. 1, system 100 for executing a Shared Read Flow includes two cores 102 and 104, (or accelerators) connected, using connectors 106, 108, 110, and 112 to memory controller 113, which includes common request tracker (CRT) 114, and which is connected, using connectors 116 and 118, to cache 120, which is connected, using connectors 122 and 124, to memory 126.

Operation here starts the same way as the operation illustrated in FIG. 2A. Namely, in operation, memory controller 113 receives four shared read requests (SRRs) addressed to A, B, C, and D, from core 1 102 at times 1, 2, 3, and 4, when a Leader core is not yet identified. Memory controller 113 allocates four entries in CRT 114, and stores the SRRs therein.

Here, memory controller 113 treats core 1 102 as the Leader core because its first SRR to address A was received sooner, at time 1, than the SRR from core 2 104 to the same address, A, which was received at time 10. Though not shown, memory controller 113 marks the four CRT entries as Leaders, sets the share distance (e.g., Current_Shared_Distance) to one after storing the first SRR, and increments it after storing the next three SRRs.

Memory controller 113 then sends four read requests addressing A, B, C, and D at times 9, 11, 13 and 16 to cache 120.

Unlike FIG. 2A, however, an error occurs in this illustrated embodiment. Here, memory controller 113 receives SRRs from core 2 104 in the WRONG ORDER. Here, core 2 102 sends SRRs addressing A, B, and D at times 10, 12, and 15. The SRR addressing C was missed. This is an example of a Shared_Read Mismatch Error, insofar as a SRR from the Follower does not match a pending request from the Leader. This error condition may indicate a software problem, for example when some requests were marked by mistake as a Shared_Read (or were not marked when needed, or, for example, the Leader and Follower cores may be running different applications. Error conditions may also arise due to hardware problems. According to disclosed embodiments, memory controller 113 can respond in multiple different ways, including: 1) Raising an error flag (which may trigger an exception or a fault) and 2) Reset all Shared_Read states in CRT to let the system continue running with no hang.

Here, at around time 15, memory controller 113 detects the mismatch error and resets the sharing controls in CRT 114. The original SRRs sent from core 1 102 then proceed like regular reads. Namely, cache 120 sends four requests addressing A, B, C< and D, to memory 124 at times 17, 18, 19, and 20. The read data, addressed by A, B, C, and D, returns from memory 124 to cache 120 at times 21, 22, 23, and 24, and from cache 120 to memory controller 113 at times 25, 26, 27, and 28. Memory controller 113 stores the read data into the CRT entries holding the SRRs to A, B, C, and D. The memory controller also returns the read data addressed by A, B, C, and D, to the Leader core 102 at times 29, 30, 31, and 32.

At this point, the memory controller, though not shown, is to service the SRRs received from core 2 104 at times 10, 12, and 15, and treats them as regular reads.

Figure 2C:
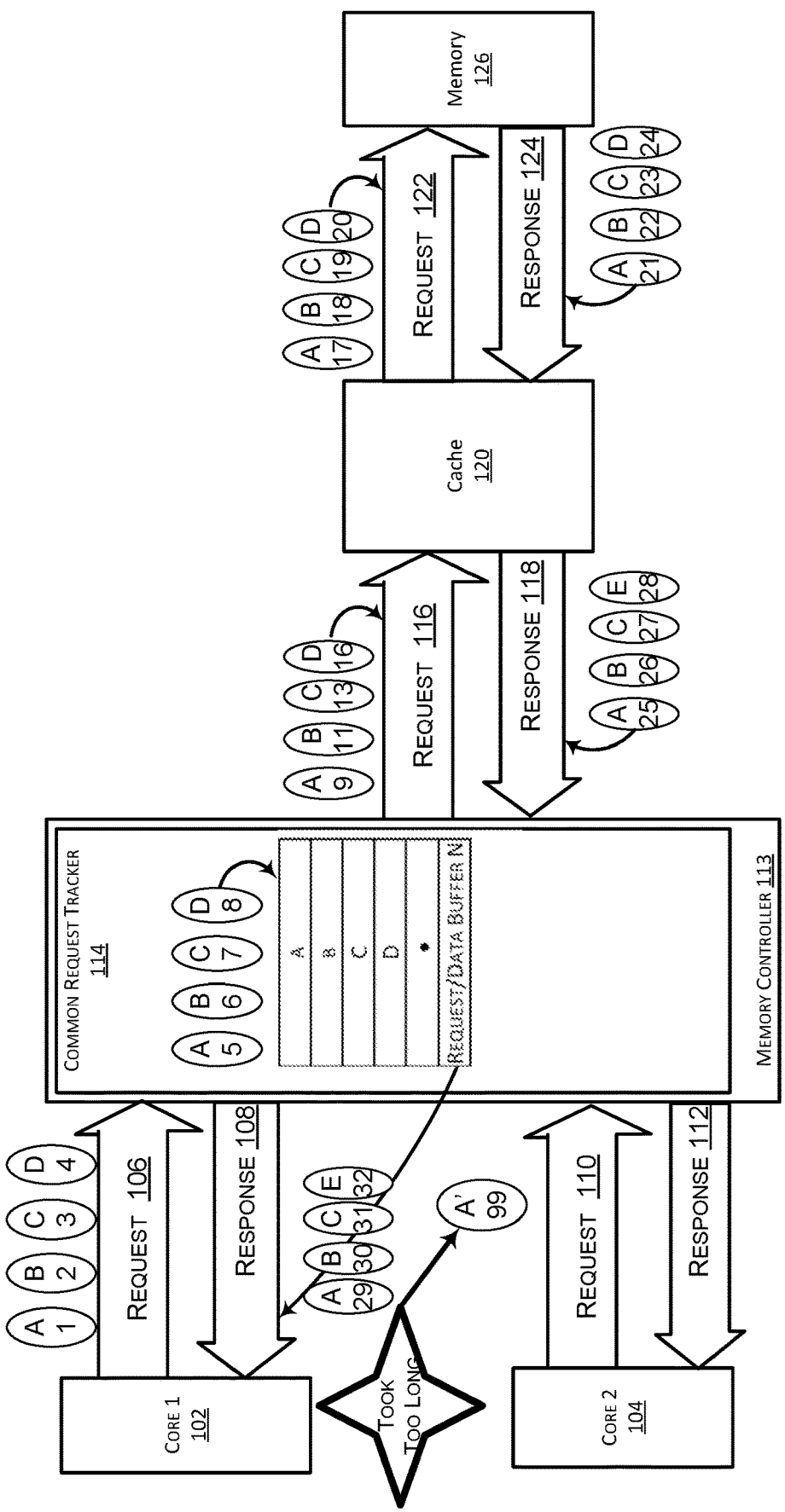
FIG. 2C is another block diagram exemplifying use of a request tracker as a temporary cache while performing a shared read request, according to some embodiments.

FIG. 2C is another block diagram exemplifying use of a request tracker as a temporary cache while performing a shared read request, according to some embodiments. As shown, using the same labels as in FIG. 1, system 100 for executing a Shared Read Flow includes two cores 102 and 104, (or accelerators) connected, using connectors 106, 108, 110, and 112 to memory controller 113, which includes common request tracker (CRT) 114, and which is connected, using connectors 116 and 118, to cache 120, which is connected, using connectors 122 and 124, to memory 126.

Operation here starts the same way as the operation illustrated in FIGS. 2A and 2B. Namely, memory controller 113 receives four shared read requests (SRRs) addressed to A, B, C, and D, from core 1 102 at times 1, 2, 3, and 4, when a Leader core is not yet identified. Memory controller 113 allocates four entries in CRT 114, and stores the SRRs therein.

Here, memory controller 113 treats core 1 102 as the Leader core because its first SRR to address A was received sooner, at time 1, than the SRR from core 2 104 to the same address, A, which was received at time 10. Though not shown, memory controller 113 marks the four CRT entries as Leaders, sets the share distance (e.g., Current_Shared- _Distance) to one after storing the first SRR, and increments it after storing the next three SRRs.

Memory controller 113 then sends four read requests addressing A, B, C, and D at times 9, 11, 13 and 16 to cache 120, which forward them to memory 124 at times 17, 18, 19, and 20. Memory 124 returns read data addressed by A, B, C, and D, at times 21, 22, 23, and 24, to cache 120, which returns them to memory controller 113 at times 25, 26, 27, and 28. Memory controller 113 then returns the read data addressed by A, B, C, and D at times 29, 30, 31, and 32 to core 1 102.

Unlike FIG. 2A, however, an error occurs in this illustrated embodiment. Here, core 2 104 sends an SRR addressing A at time 99, which is TOO LONG to respond because it is more than a threshold amount of time later than the SRR to address A sent by core 1 102 at time 1. This is an example of a Follower Timeout Error, insofar as a SRR from the Follower took longer than a threshold amount of time to appear. This error condition may indicate a software problem, for example when some requests were marked by mistake as a Shared_Read (or were not marked when needed, or, for example, the Leader and Follower cores may be running different applications. Error conditions may also arise due to hardware problems, and may optionally be detected and reported.

According to disclosed embodiments, memory controller 113 can respond in multiple different ways, including: 1) Raising an error flag (which can trigger an exception or a fault) and/or 2) Reset all shared read states in the CRT to let the system continue running with no hang.

Here, at some time before time 99, memory controller 113 detects the Follower Timeout error, and resets the sharing controls in CRT 114. The original SRRs sent from core 1 102 then proceed like regular reads. Namely, cache 120 sends four requests addressing A, B, C and D, to memory 124 at times 17, 18, 19, and 20. The read data, addressed by A, B, C, and D, returns from memory 124 to cache 120 at times 21, 22, 23, and 24, and from cache 120 to memory controller 113 at times 25, 26, 27, and 28. Memory controller 113 stores the read data into the CRT entries holding the SRRs to A, B, C, and D. The memory controller also returns the read data addressed by A, B, C, and D, to the Leader core 102 at times 29, 30, 31, and 32.

At this point, the memory controller, though not shown, is to service the SRRs received from core 2 104 at times 10, 12, and 15 as regular reads.

Figure 3:
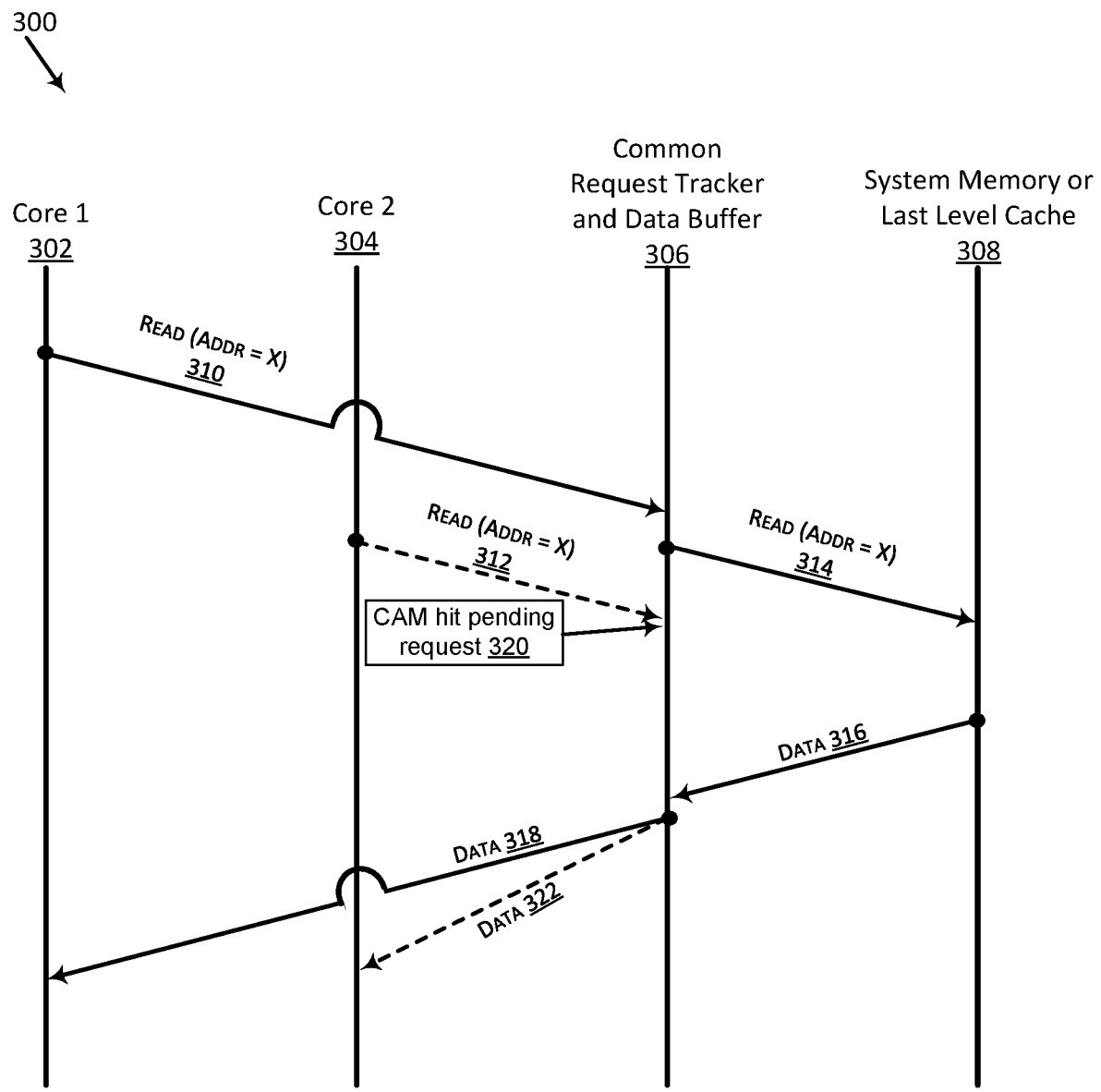
FIG. 3 is a flow diagram illustrating performance of a shared read request using a request tracker as a temporary cache, according to some embodiments.

FIG. 3 is a block diagram illustrating an example of using a request tracker as a temporary cache while performing a shared read request, according to some embodiments. As shown, system 300 includes four interconnect destinations: core 1 302, core 2 304, common request tracker 306, and memory subsystem 308, which can include a last level cache and a system memory.

In operation, core 1 302 at 310 sends a shared read request (SRR) to address A to CRT 306. CRT 306 adds the SRR to an entry, and at 314 sends a read request to the memory subsystem 308. A short time later, a matching SRR from core 2 304 is received at 312. At 320, the CRT searches the entries using a CAM to notice that the SRR from the LEADER has arrived. Since the core 2 SRR matches a pending request from the other core, is not sent to the Cache/Memory. Instead, it waits for arrival of the data of read data from the memory subsystem at 316. Then, CRT 306 uses the same data to satisfy both requests, which are sent to core 1 and core 2 at 318 and 322, respectively.

Figure 4:
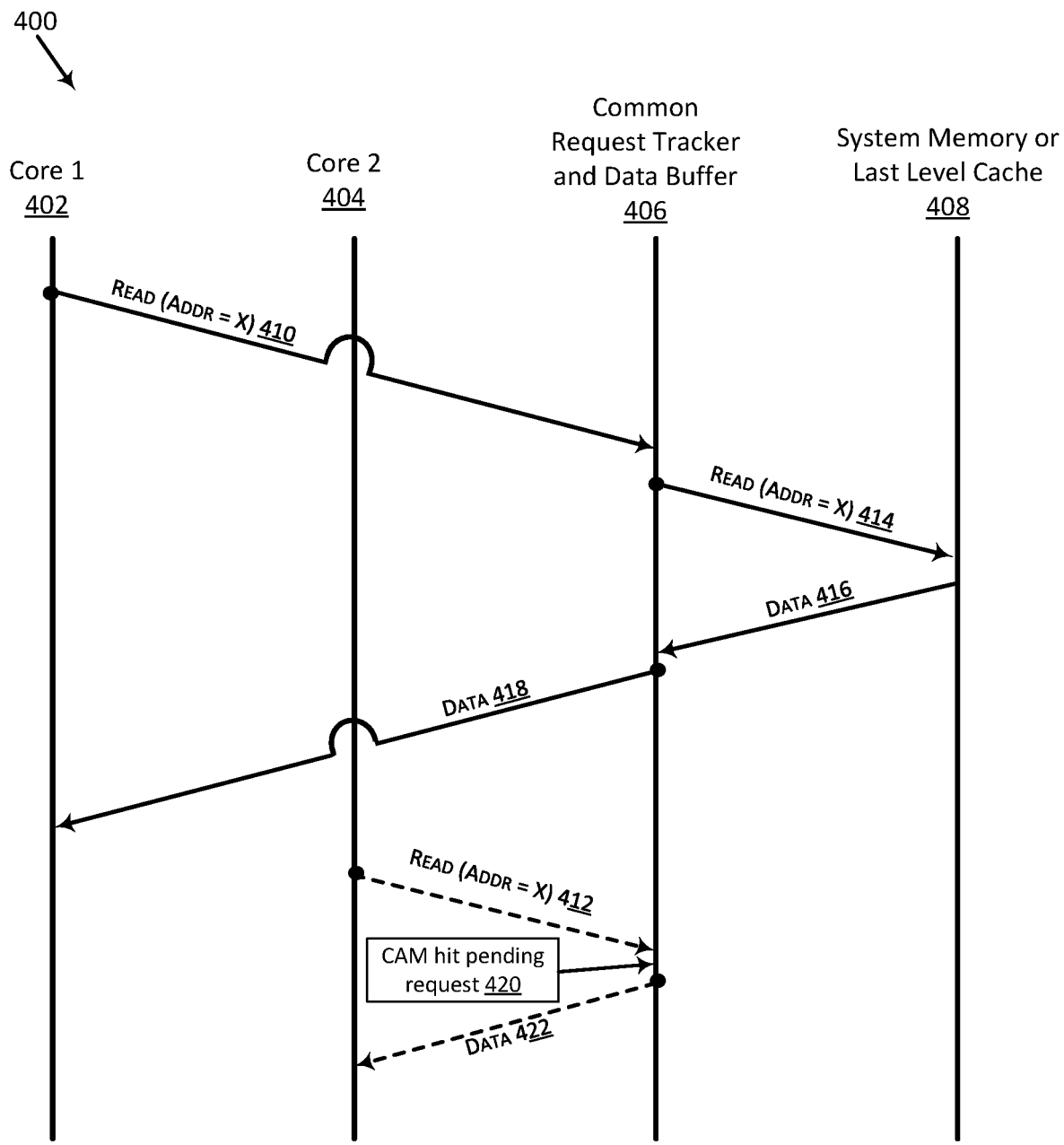
FIG. 4 is another flow diagram illustrating performance of a shared read request using a request tracker as a temporary cache, according to some embodiments.

FIG. 4 is a block diagram illustrating an example of using a request tracker as a temporary cache while performing a shared read request, according to some embodiments. As shown, system 400 includes four interconnect destinations: core 1 402, core 2 404, common request tracker 406 (CRT), and memory subsystem 408, which can include a last level cache and a system memory.

In operation, core 1 at 410 sends a shared read request (SRR) to address A to CRT 406, which adds the SRR to an entry, and at 414 sends a read request to the memory subsystem 408. At 416, read data returns from memory subsystem 408 to CRT 406, and then to core 1 402 at 418.

Now, exemplifying the advantages of disclosed embodiments, CRT 406 does not deallocate the entry used by core 1. Instead, a short time later, a matching SRR from core 2 is received at 412. At 420, the CRT searches the entries using a CAM to notice that the SRR from the LEADER has arrived. Since the core 2 SRR matches a pending request from the other core, the SRR is not sent to the Cache/Memory. Instead, since the read data was received at 416 and is currently in a CRT entry, CRT 406 at 422 returns read data to core 2 404.

Figure 5:
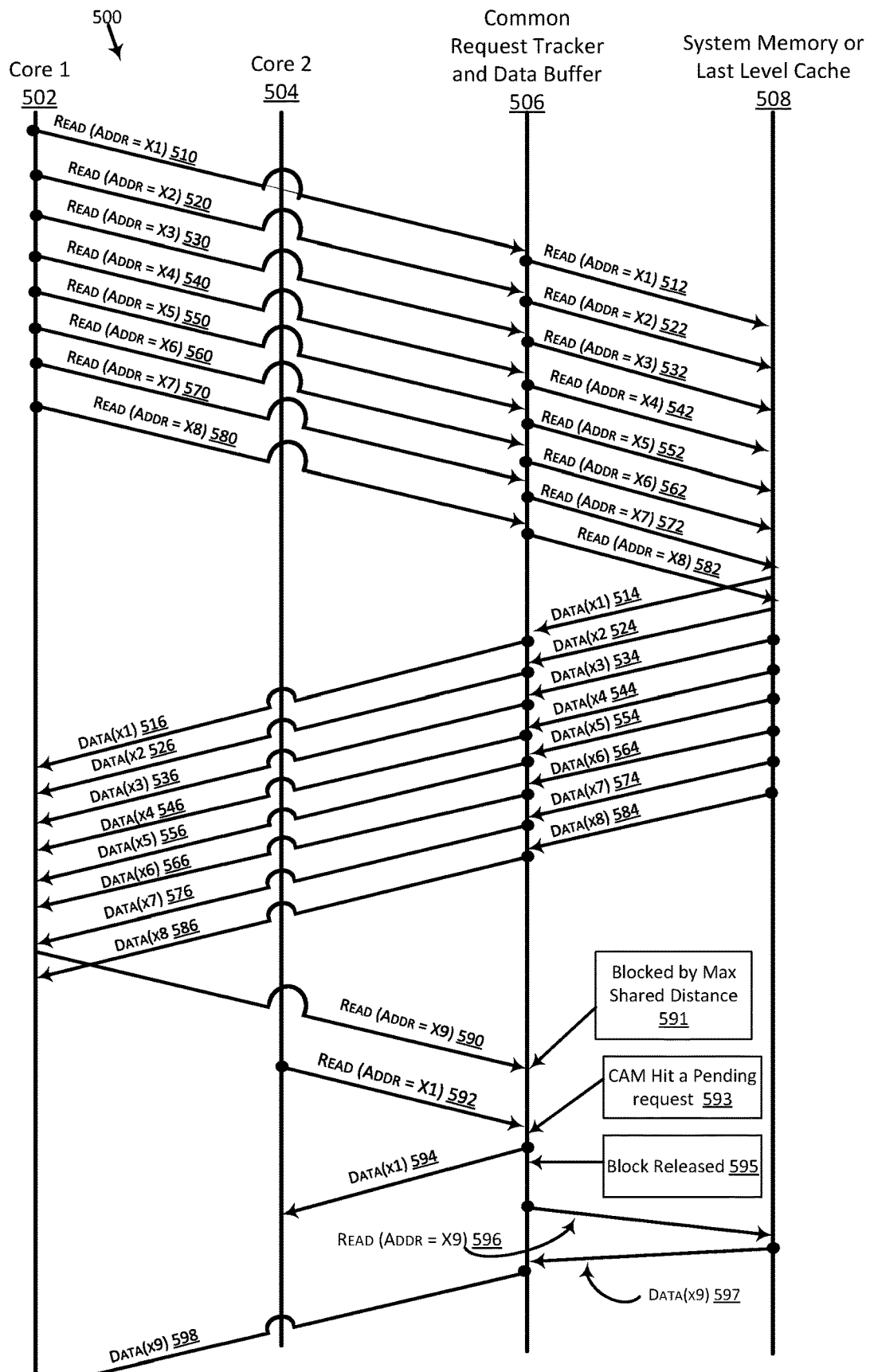
FIG. 5 is another flow diagram illustrating performance of a shared read request using a request tracker as a temporary cache, according to some embodiments.

FIG. 5 is another flow diagram illustrating performance of a shared read request using a request tracker as a temporary cache, according to some embodiments. As shown, system 500 includes four interconnect destinations: core 1 502, core 2 504, common request tracker 506 (CRT), and memory subsystem 508, which can include a last level cache and a system memory. Here, the Max_Shared_Distance is 8.

In operation, core 1 502, acting as the Leader, issues 8 Shared_Read requests, at 510, 520, 530, 540, 550, 560, 570, and 580 to CRT 506 which forwards them to memory subsystem 508 at 512, 522, 532, 542, 552, 562, 572, and 582. Data returns from memory subsystem 508 to CRT 506 at 514, 524, 534, 544, 554, 564, 574, and 584, and then to core 1 at 516, 526, 536, 546, 556, 566, 576, and 586.

At 590, core 1 502 sends SRR with address set to X9, but, since Max_Shared_Distance is programmed to 8, CRT 506 at 591 blocks SRR x9 until SRR x1 of core 2 504 is received. At 592, a SRR to address X1 is received from core 2 504, which after conducting a CAM search at 593, identifies read data already arrived in the CRT for address X1. At 594, instead of issuing another request (for address X1) to the memory subsystem, CRT 506 returns the data stored in the CRT 506 to core 2 504. At 595, CRT 506 releases the block.

Note that core 1 502 in some embodiments is unaware of the Max_Shared_Distance, and may try to send SRRs addressed to 10, 11, 12, etc. But in some such embodiments, CRT 506 blocks core 1 502 from sending an more SRRs after the ninth one. Depending on the amount of available buffer space, CRT may well block core 1 from sending any SRRs beyond the eighth one, or beyond the tenth one, or beyond the eleventh one, and so on.

At 596, CRT 506 forwards a read request (Addr=X9), corresponding to the SRR that was blocked at 591, to memory subsystem 508, which responds at 597 by returning data to CRT 506, which at 598 returns the data to core 1 502.

Figure 6:
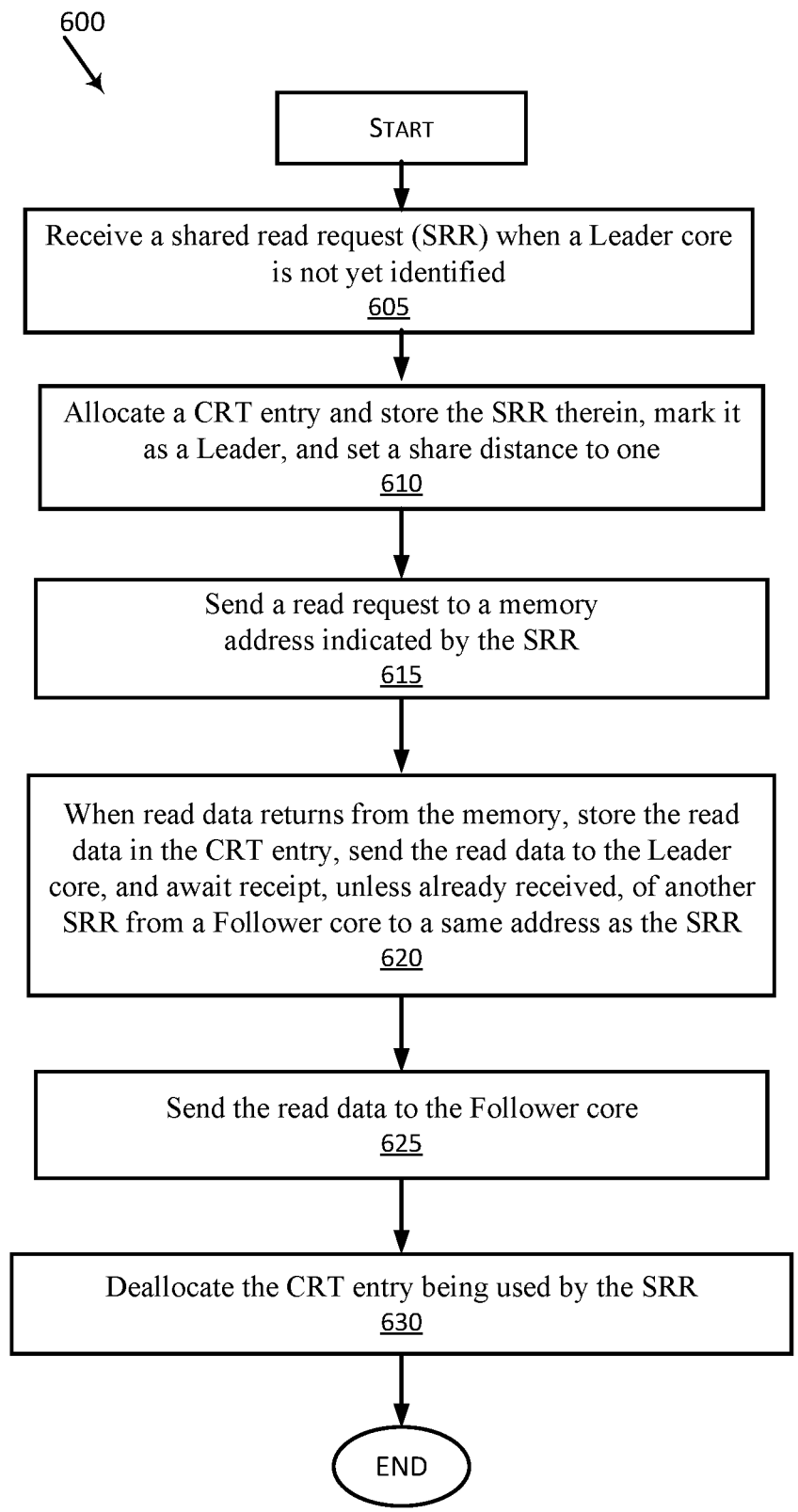
FIG. 6 is a flow diagram illustrating a process performed by a memory controller to execute a shared read request, according to some embodiments.

FIG. 6 is a flow diagram illustrating a process performed by a memory controller to execute a shared read request, according to some embodiments. It should be noted that flow 600 can also be performed by a common request tracker (CRT) and related circuitry. Flow 600, after starting, the memory controller at 605 is to receive a shared read request (SRR) when a Leader core is not yet identified. At 610, the memory controller is to allocate a CRT entry and store the SRR therein, mark it as a Leader, and set a share distance to one. Then, at 615, the memory controller is to send a read request to a memory address indicated by the SRR. At 620, the memory controller is to, when read data returns from the memory, store the read data in the CRT entry, send the read data to the Leader core, and await receipt, unless already received, of another SRR from a Follower core to a same address as the SRR. At 625, the memory controller is to send the read data to the Follower core. At 630, the memory controller is to deallocate the CRT entry being used by the SRR. Flow 600 then ends.

Figure 7:
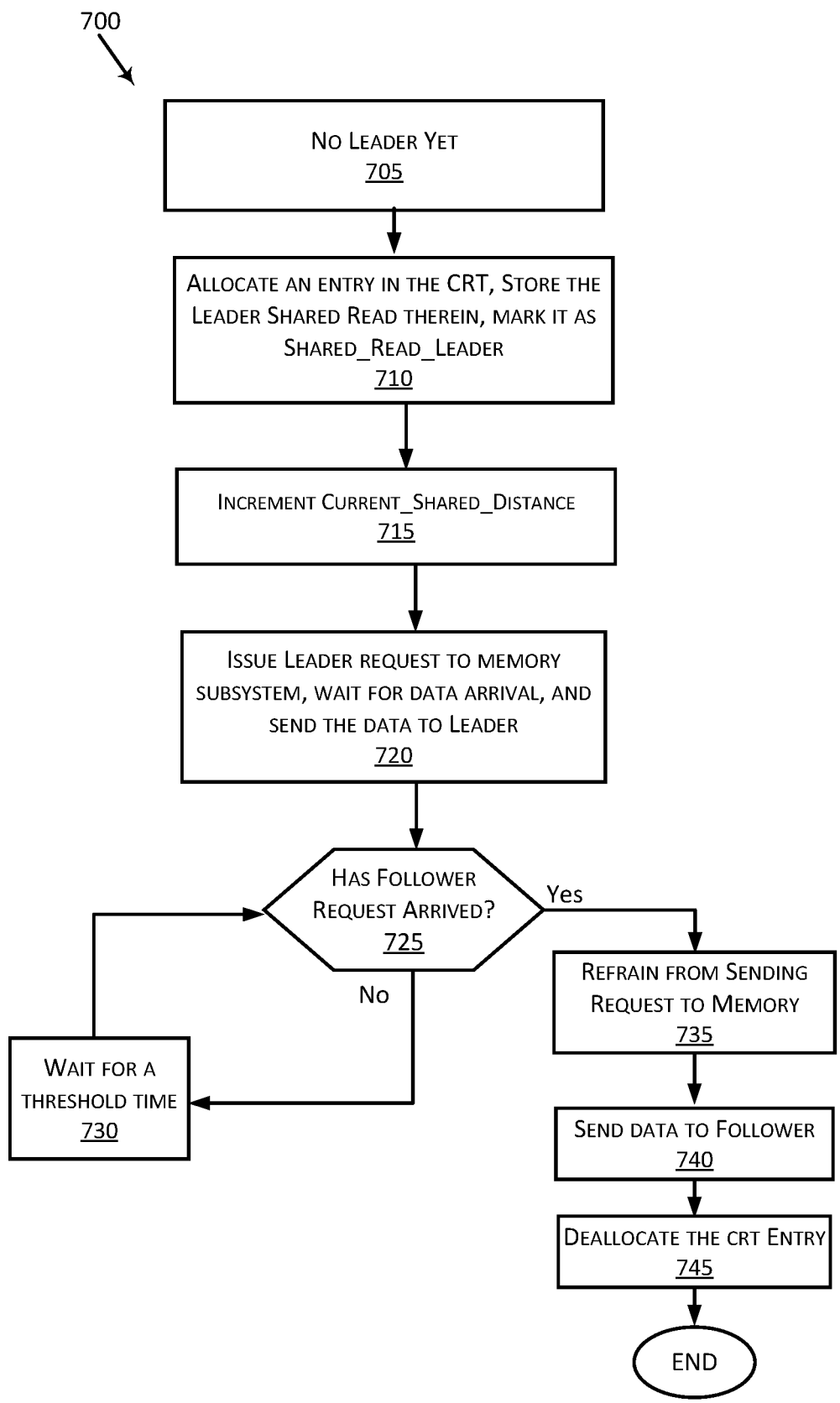
FIG. 7 a flow diagram illustrating a process performed by a memory controller to execute a shared read request, according to some embodiments.

FIG. 7 is a flow diagram illustrating a process performed by a memory controller to execute a shared read request, according to some embodiments. It should be noted that flow 700 can also be performed by a common request tracker (CRT) and related circuitry. As shown, flow 700 begins at 705, when a Leader has not yet been identified. Upon receiving a shared read request (SRR), the memory controller at 710 is to allocate an entry in the common request tracker (CRT), store the SRR therein, and mark it as Shared_Read_Leader. At 715, the memory controller is to increment Current_Shared_Distance. At 720, the memory controller is to issue a request reflecting the Leader's SRR to the memory subsystem, wait for data to arrive, and send the data to the Leader. At 725, the memory controller is to determine whether a SRR from the Follower has arrived yet. If not, the memory controller at 730 waits for a threshold amount of time and then returns to 725 to check again. It should of course be noted that in some embodiments, the memory controller need not necessarily wait for a threshold amount of time, but instead is triggered by a signal generated by the hardware immediately upon arrive of the Follower's SRR. But if it is determined at 725 that the Follower SRR has arrived, the memory controller at 735 is to refrain from sending a request to the memory subsystem. In so doing, the memory controller invokes an advantage of disclosed embodiments—that of minimizing memory bandwidth and power utilization. Rather than to ask for the data from memory, the memory controller can satisfy the Follower SRR using the copy of the data stored in the Leader CRT entry. Accordingly, at 740, the memory controller sends the read data stored in the Leader CRT entry to the Follower. At 745, the memory controller is to deallocate the CRT entry that was used to store the Follower SRR. The flow then ends.

Figure 8:
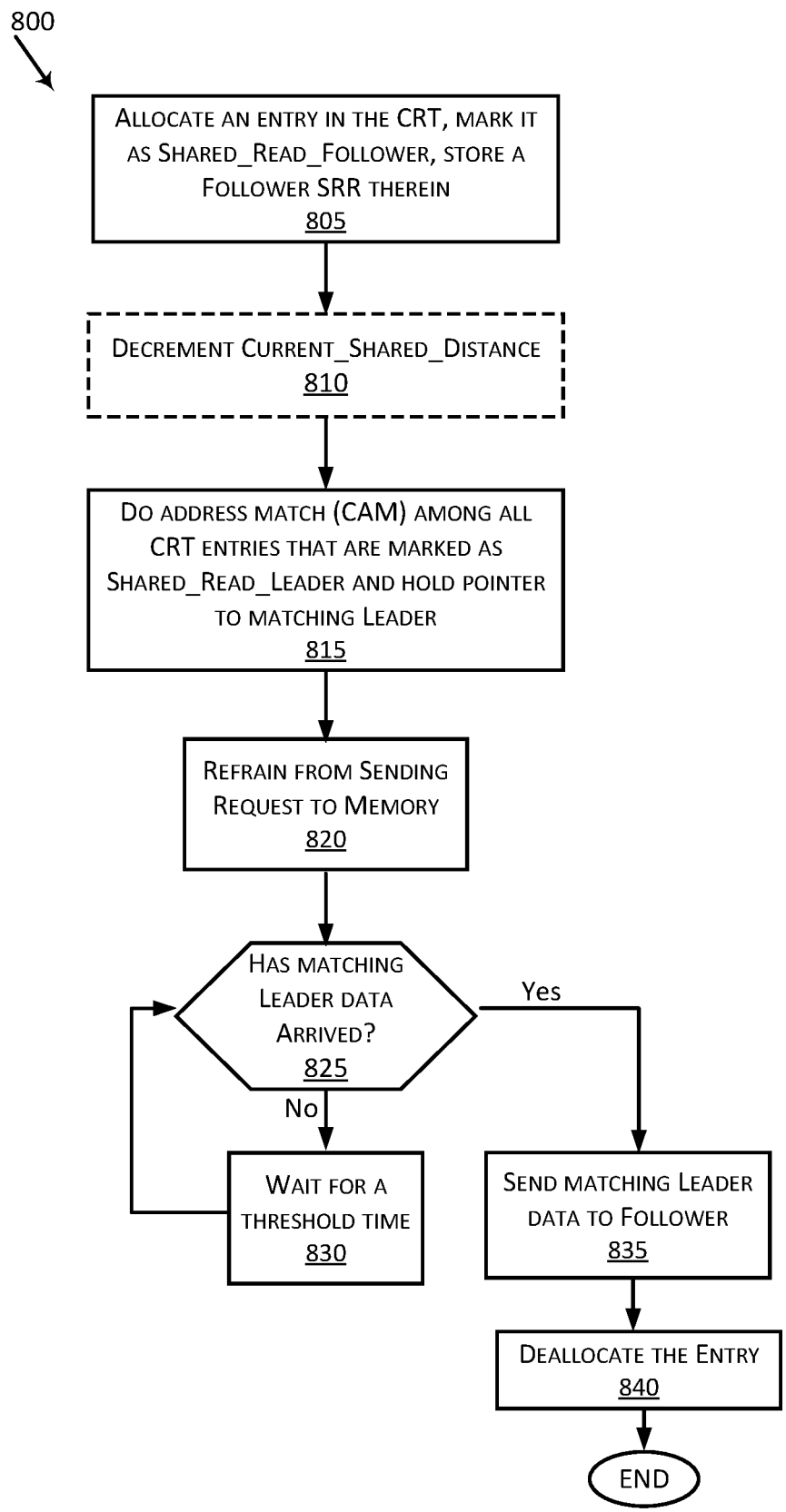
FIG. 8 is a flow diagram illustrating a process performed by a memory controller to execute a shared read request, according to some embodiments.

FIG. 8 is a flow diagram illustrating a process performed by a memory controller to execute a shared read request, according to some embodiments. Flow 800 is sometimes referred to as a Follower Shared Read Flow. It should be noted that flow 800 can also be performed by a common request tracker (CRT) and related circuitry. Flow 800 begins at operation 805, at which time the memory controller is to allocate an entry in the common request tracker (CRT), store a shared read request (SRR) received from the Follower therein, and mark it as Shared_Read Follower. In some embodiments, the memory controller at 810 is to decrement Current_Shared_Distance (as noted above, Current_Shared_Distance in some embodiments is incremented upon receipt of an SRR from the Leader, and decremented upon receipt of an SRR from the Follower). At 815, the memory controller is to do an address match (CAM) among all CRT entries that are marked as Shared_Read_Leader and hold pointer to matching Leader. At 820, the memory controller is to refrain from sending a request to Memory. In so doing, the memory controller invokes an advantage of disclosed embodiments—that of minimizing memory bandwidth and power utilization. Rather than to ask for the data from memory, the memory controller can access the copy of the data stored in the Leader CRT entry. At 825, the memory controller is to determine whether matching Leader data has arrived. If not, the memory controller at 830 is to wait for a threshold amount of time, then check again at 825. As mentioned above with respect to operation 720 of flow 700, it should be noted that in some embodiments, the memory controller need not necessarily wait for a threshold amount of time, but instead is triggered by a signal generated by the hardware immediately upon arrive of the Follower's SRR. But if it is determined at 825 that Leader data has arrived, the memory controller at 835 is to send the Leader data to the Follower, and at 840 is to deallocate the CRT entry that was holding the Follower SRR. The process then ends.

For ease of understanding, flows 600, 700, 800 are illustrated independently and could well be performed independently. It should be noted, however, that, in operation according to some embodiments, a Leader SRR flow (flow 600 or 700) starts when the Leader sends the first and subsequent SRRs. In parallel, 1 or more cycles later, the Follower SRR (flow 800) starts. As a result of the address CAM that is done by the Follower SRR flow, a connection between the Leader and Follower flows is established.

Note that, in some implementations, the memory controller allocates different CRT entries for Leader and Follower entries (with some sort of pointer between them), while other in other embodiments, the same CRT entry for both the Leader and the Follower SRRs.

Figure 9:
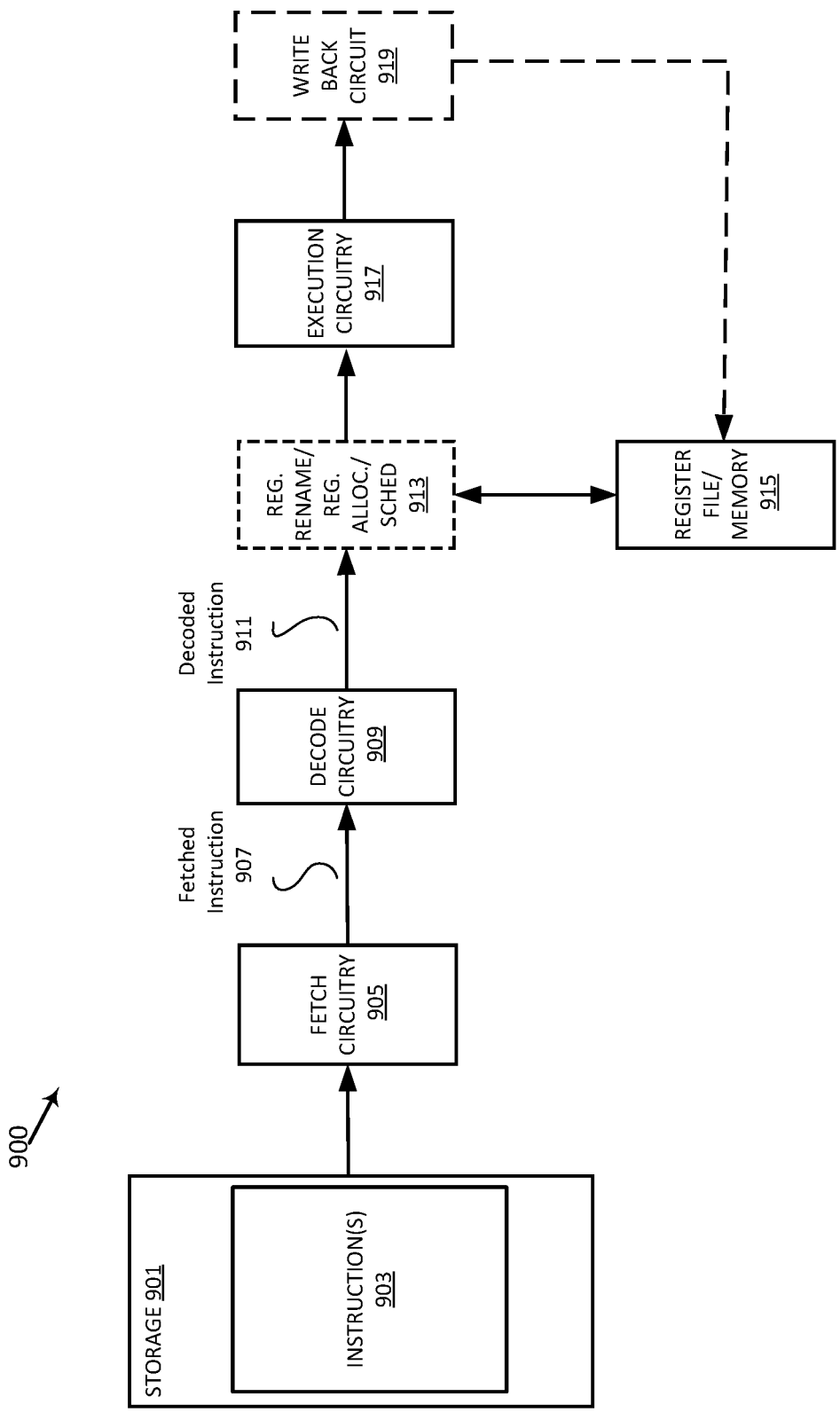
FIG. 9 is a block diagram illustrating processing components for executing instructions, according to some embodiments.

FIG. 9 is a block diagram illustrating processing components for executing instructions, according to some embodiments. As illustrated, storage 901 stores instruction(s) 903 to be executed. As described further below, in some embodiments, computing system 900 is a SIMD processor to concurrently process multiple elements of packed-data vectors, including matrices.

In operation, the instruction(s) 903 is fetched from storage 901 by fetch circuitry 905. The fetched instruction 907 is decoded by decode circuitry 909. The instruction format, which is further illustrated and described with respect to FIGS. 10A-B, and 11A-D, has fields (not shown here) to specify locations of first, second, and destination vectors. Decode circuit 909 decodes the fetched instruction 907 into one or more operations. In some embodiments, this decoding includes generating multiple micro-operations to be performed by execution circuitry (such as execution circuitry 917). The decode circuit 909 also decodes instruction suffixes and prefixes (if used).

In some embodiments, register renaming, register allocation, and/or scheduling circuit 913 provides functionality for one or more of: 1) renaming logical operand values to physical operand values (e.g., a register alias table in some embodiments), 2) allocating status bits and flags to the decoded instruction, and 3) scheduling the decoded instruction 911 for execution on execution circuitry 917 out of an instruction pool (e.g., using a reservation station in some embodiments).

Registers (register file) and/or memory 915 store data as operands of the decoded instruction 911 to be operated on by execution circuitry 917. Execution circuitry 917 is further described and illustrated below, at least with respect to FIGS. 13A-B and 14A-B.

Exemplary register types include writemask registers, packed data registers, general purpose registers, and floating-point registers, as further described and illustrated below, at least with respect to FIG. 12.

In some embodiments, write back circuit 919 commits the result of the execution of the decoded instruction 911. Execution circuitry 917 and system 900 are further illustrated and described with respect to FIGS. 13A-B and 14A-B.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
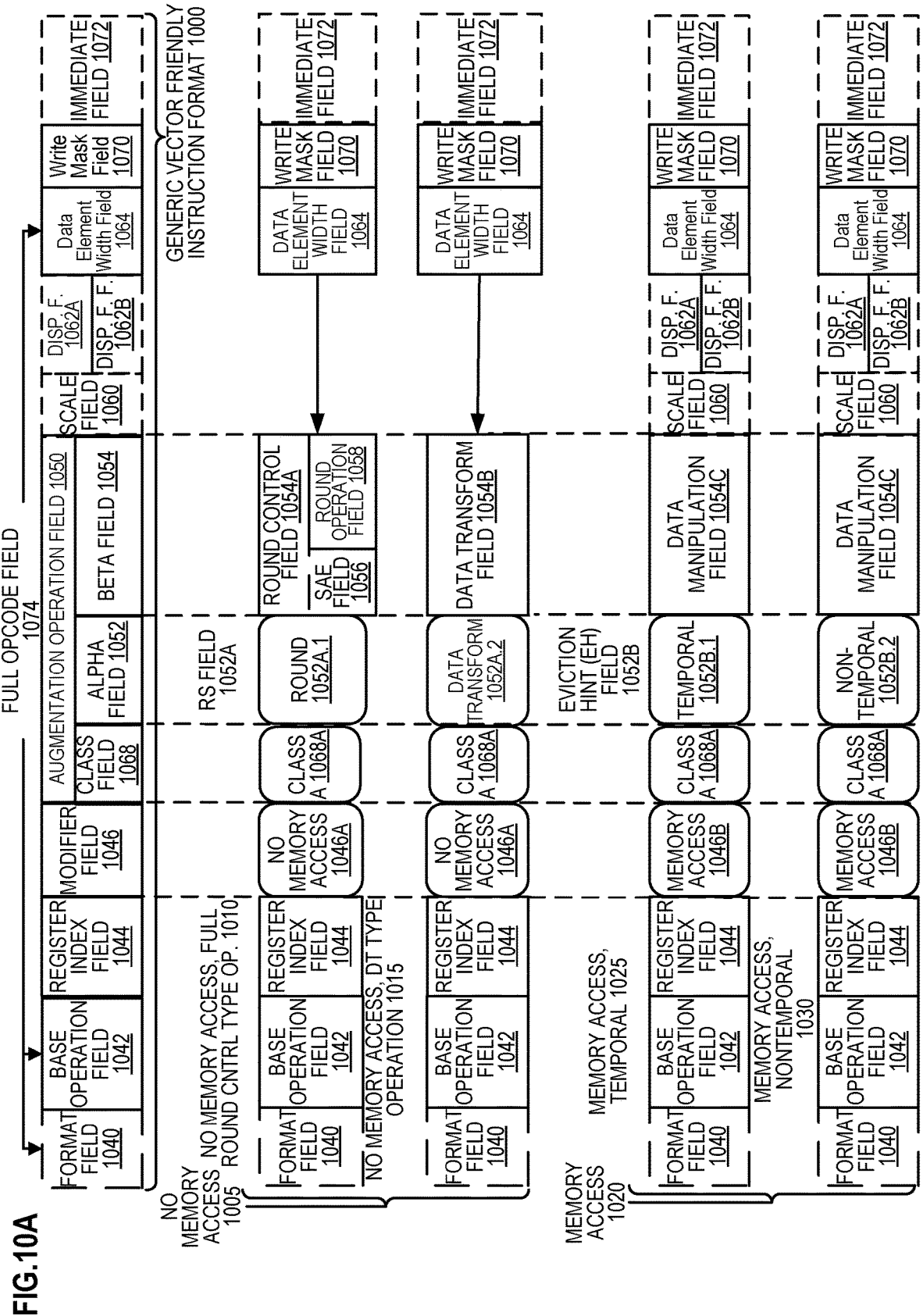
FIGS. 10A-10B are block diagrams illustrating a generic vector friendly instruction format and instruction templates thereof according to some embodiments of the invention.
Figure 10B:
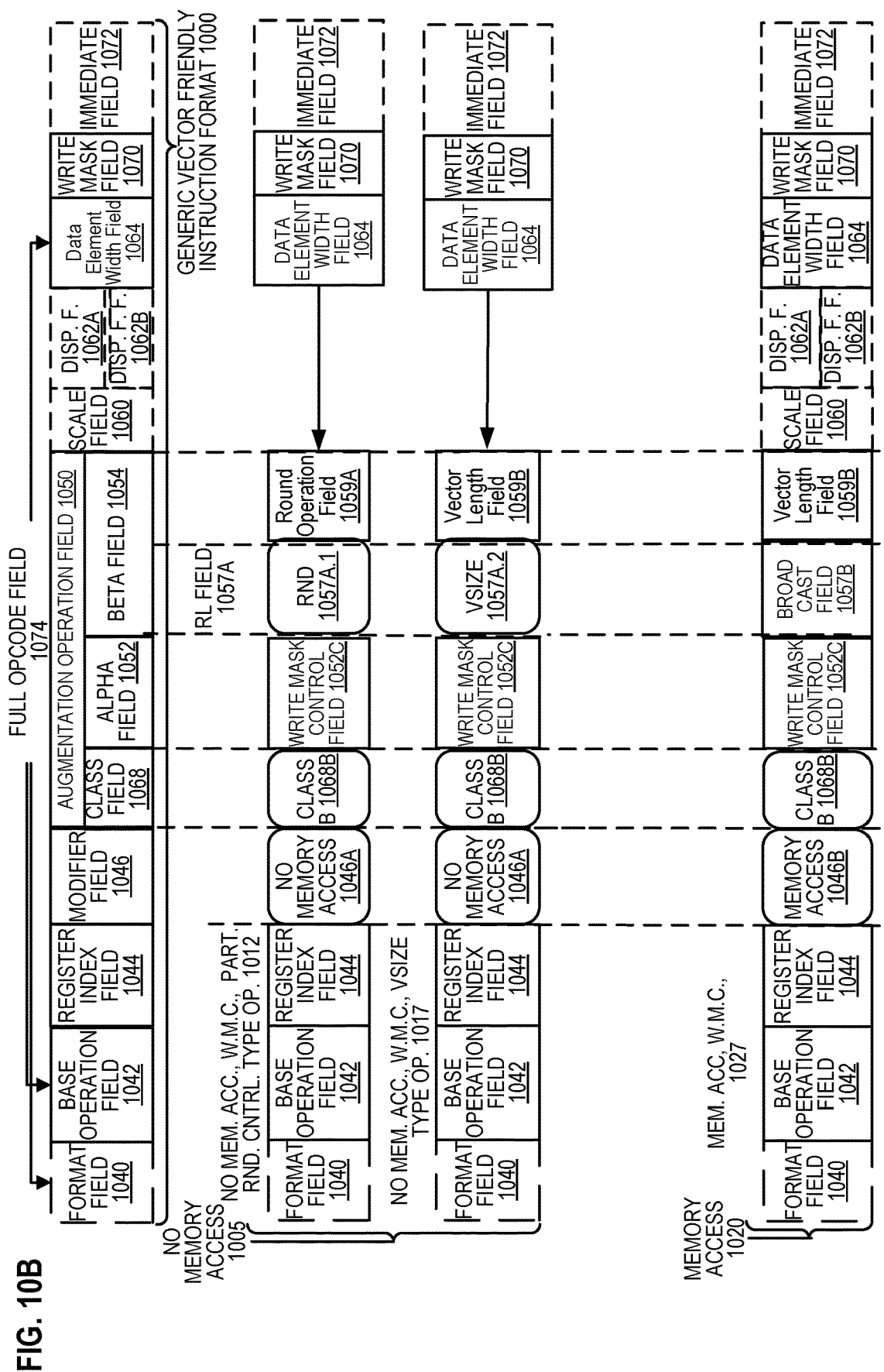

FIGS. 10A-10B are block diagrams illustrating a generic vector friendly instruction format and instruction templates thereof according to some embodiments of the invention. FIG. 10A is a block diagram illustrating a generic vector friendly instruction format and class A instruction templates thereof according to some embodiments of the invention; while FIG. 10B is a block diagram illustrating the generic vector friendly instruction format and class B instruction templates thereof according to some embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In some embodiments, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}$*index+base).

Displacement Field 1062A—its content is used as part of memory address generation (e.g., for address generation that uses $2^{scale}$*index+base+displacement).

Displacement Factor Field 1062B (note that the juxtaposition of displacement field 1062A directly over displacement factor field 1062B indicates one or the other is used)— its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the write mask field's 1070 content to directly specify the masking to be performed.

Immediate field 1072—its content allows for the specification of an immediate. This field is optional in the sense that it is not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement factor field 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating-point exceptions (SAE) field 1056 and a round operation control field 1058, alternative embodiments may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating-point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In some embodiments where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement factor field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the first-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement factor field 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating-point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In some embodiments where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement factor field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11A is a block diagram illustrating an exemplary specific vector friendly instruction format according to some embodiments of the invention. FIG. 11A shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10A or 10B into which the fields from FIG. 11A map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The specific vector friendly instruction format 1100 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in some embodiments).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and EVEX.B bit field (EVEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1110A—this is the first part of the REX' field 1110 and is the EVEX.R' bit field (EVEX Byte 1, bit [4]—R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]—U)—If EVEX.U=0, it indicates class A or EVEX.U0; if EVEX.U=1, it indicates class B or EVEX.U1.

Prefix encoding field 1125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 1110B—this is the remainder of the REX' field 1110 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]—kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand or be treated as an opcode extension and not used to encode any instruction operand. The role of R/M field 1146 may include the following: encoding the instruction operand that references a memory address or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to some embodiments. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to some embodiments. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
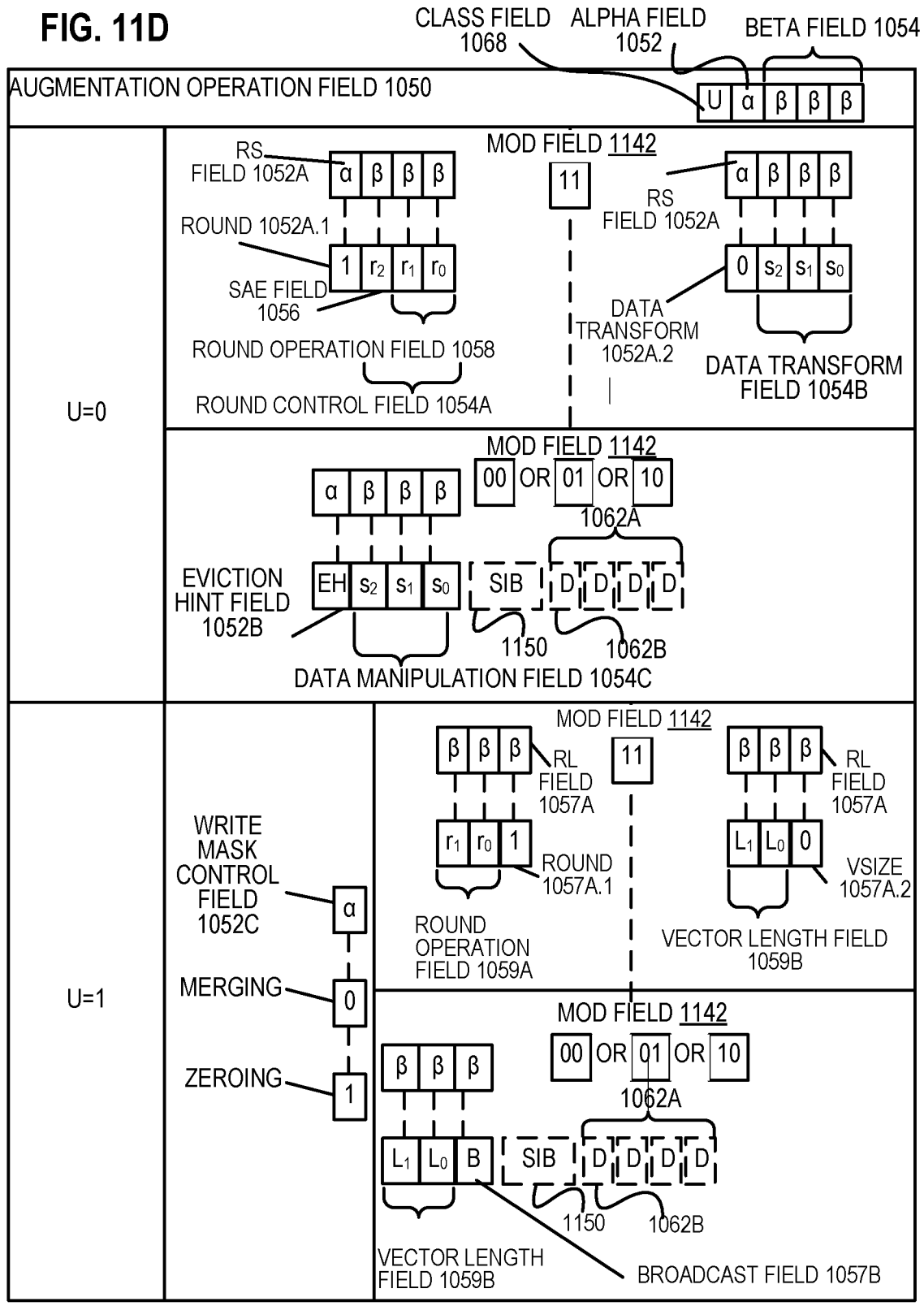
FIG. 11D is a block diagram illustrating the fields of the specific vector friendly instruction format that make up the augmentation operation field according to one embodiment.

FIG. 11D is a block diagram illustrating the fields of the specific vector friendly instruction format 1100 that make up the augmentation operation field 1050 according to some embodiments. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.A2) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—$L_{1-0}$) and the broadcast field 1057B (EVEX byte 3, bit [4]—B).

Exemplary Register Architecture

Figure 12:
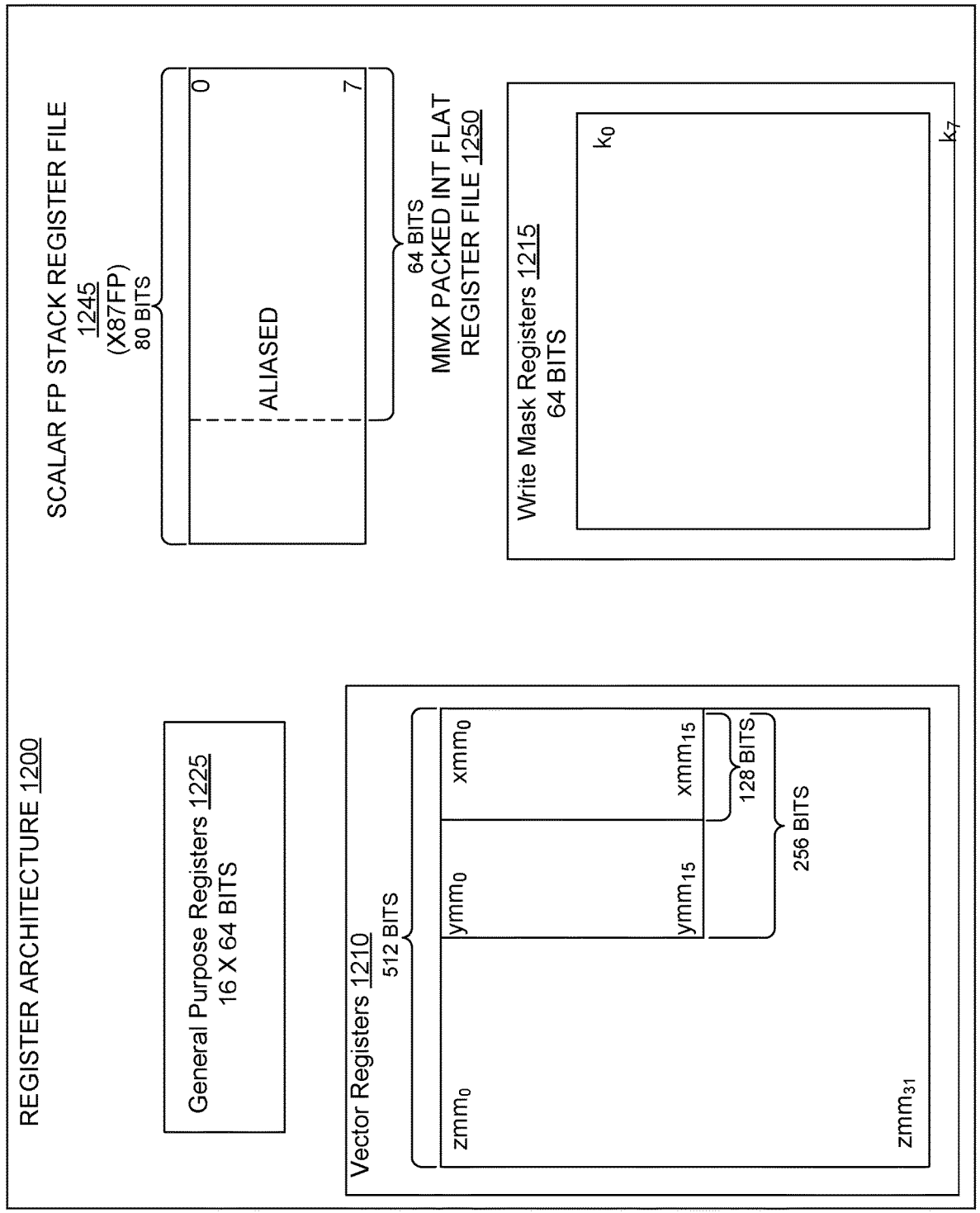
FIG. 12 is a block diagram of a register architecture according to one embodiment.

FIG. 12 is a block diagram of a register architecture 1200 according to some embodiments. In the embodiment illustrated, there are 32 vector registers 1210 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 1245, on which is aliased the MMX packed integer flat register file 1250—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to some embodiments of the invention. FIG. 13B is a block diagram illustrating both an exemplary embodiment of an in-order architecture core and an exemplary register renaming, out-of-order issue/execution architecture core to be included in a processor according to some embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 14B:
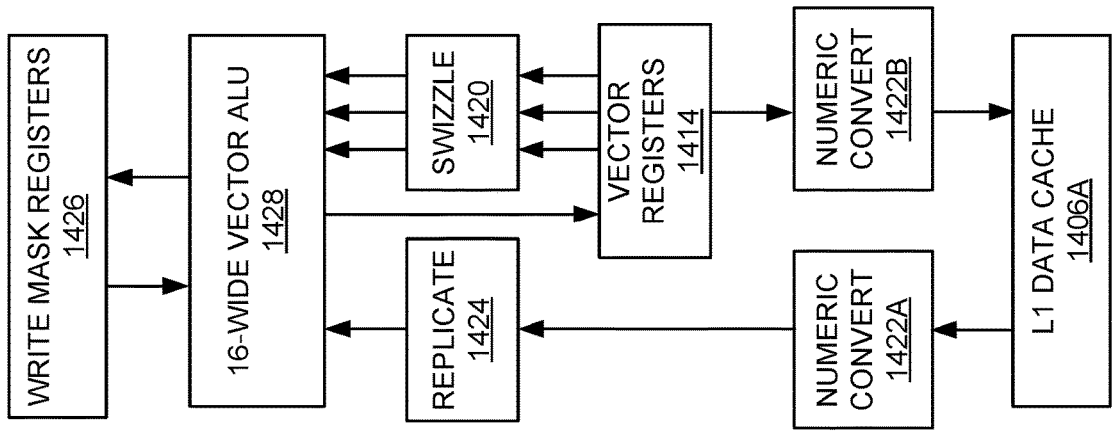
FIGS. 14A-B illustrate a block diagram of a more specific exemplary in-order core architecture, which core would be one of several logic blocks (including other cores of the same type and/or different types) in a chip.
Figure 14A:
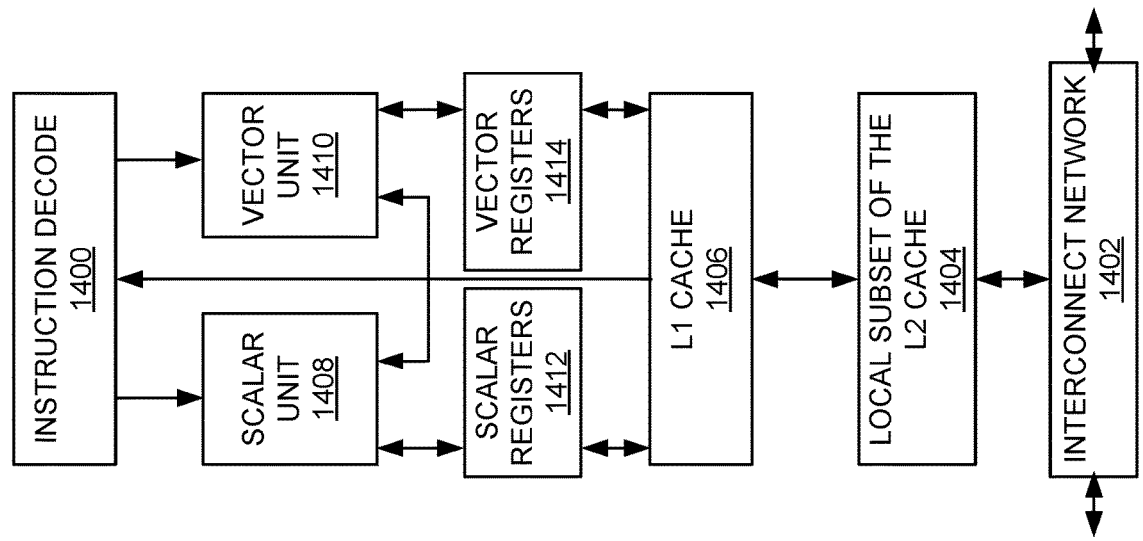

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to some embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to some embodiments of the invention. FIG. 14B includes an L1 data cache 1406A part of the L1 cache 1406, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A and 1422B, and replication with replication unit 1424 on the memory input. Write mask registers 1426 allow predicating resulting vector writes.

Figure 15:
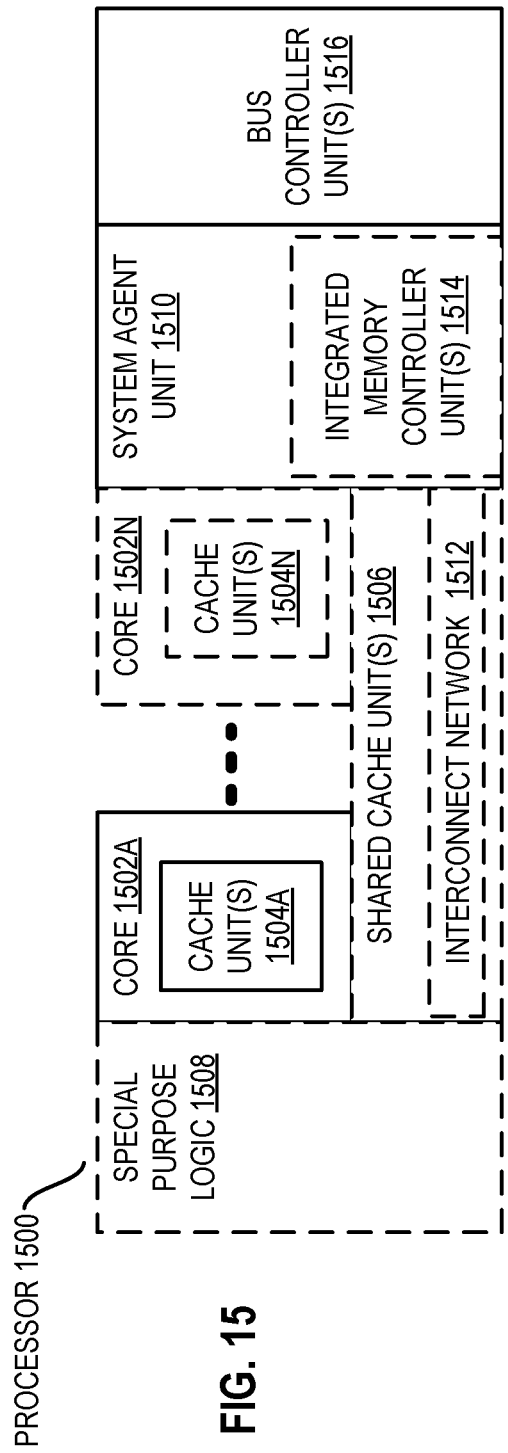
FIG. 15 is a block diagram of a processor that may have more than one core, may have an integrated memory controller, and may have integrated graphics according to some embodiments.

FIG. 15 is a block diagram of a processor 1500 that may have more than one core, may have an integrated memory controller, and may have integrated graphics according to some embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508 (integrated graphics logic 1508 is an example of and is also referred to herein as special purpose logic), the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
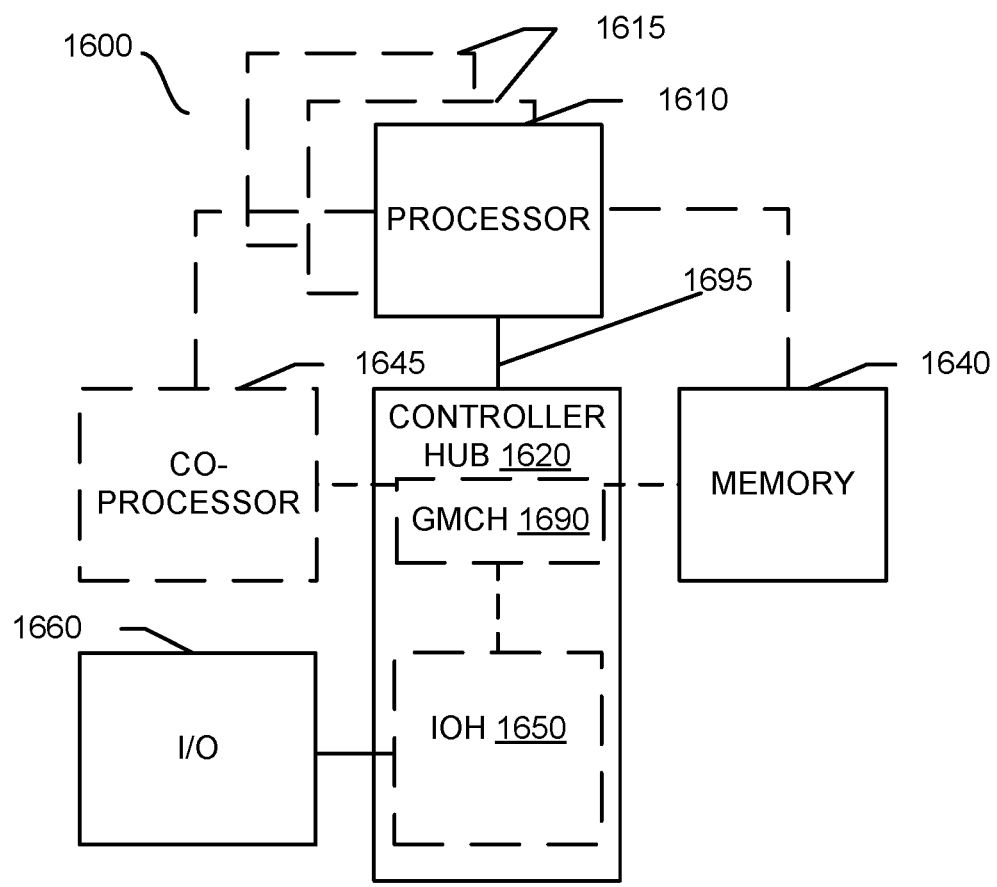
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
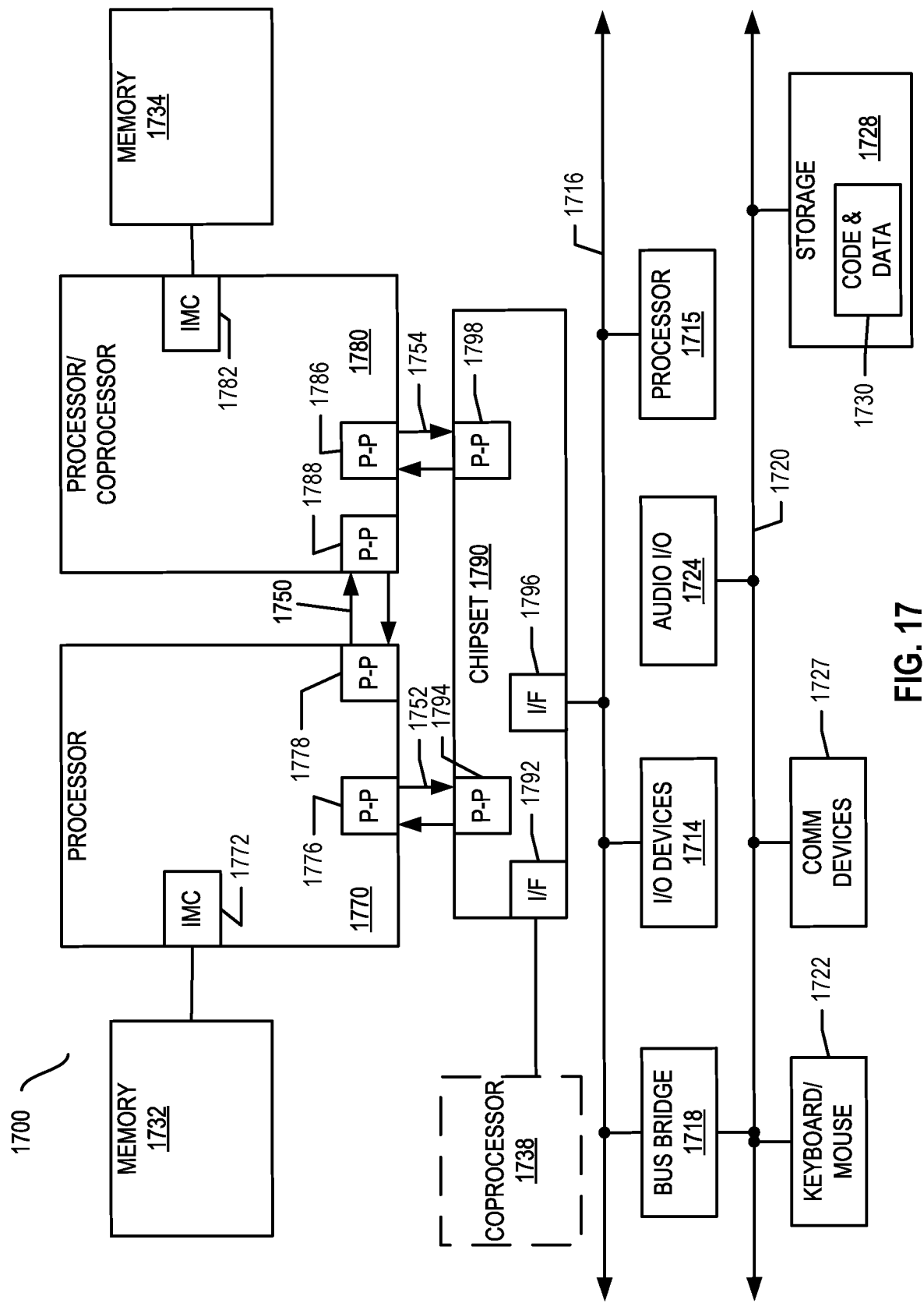

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In some embodiments, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772, and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1792. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
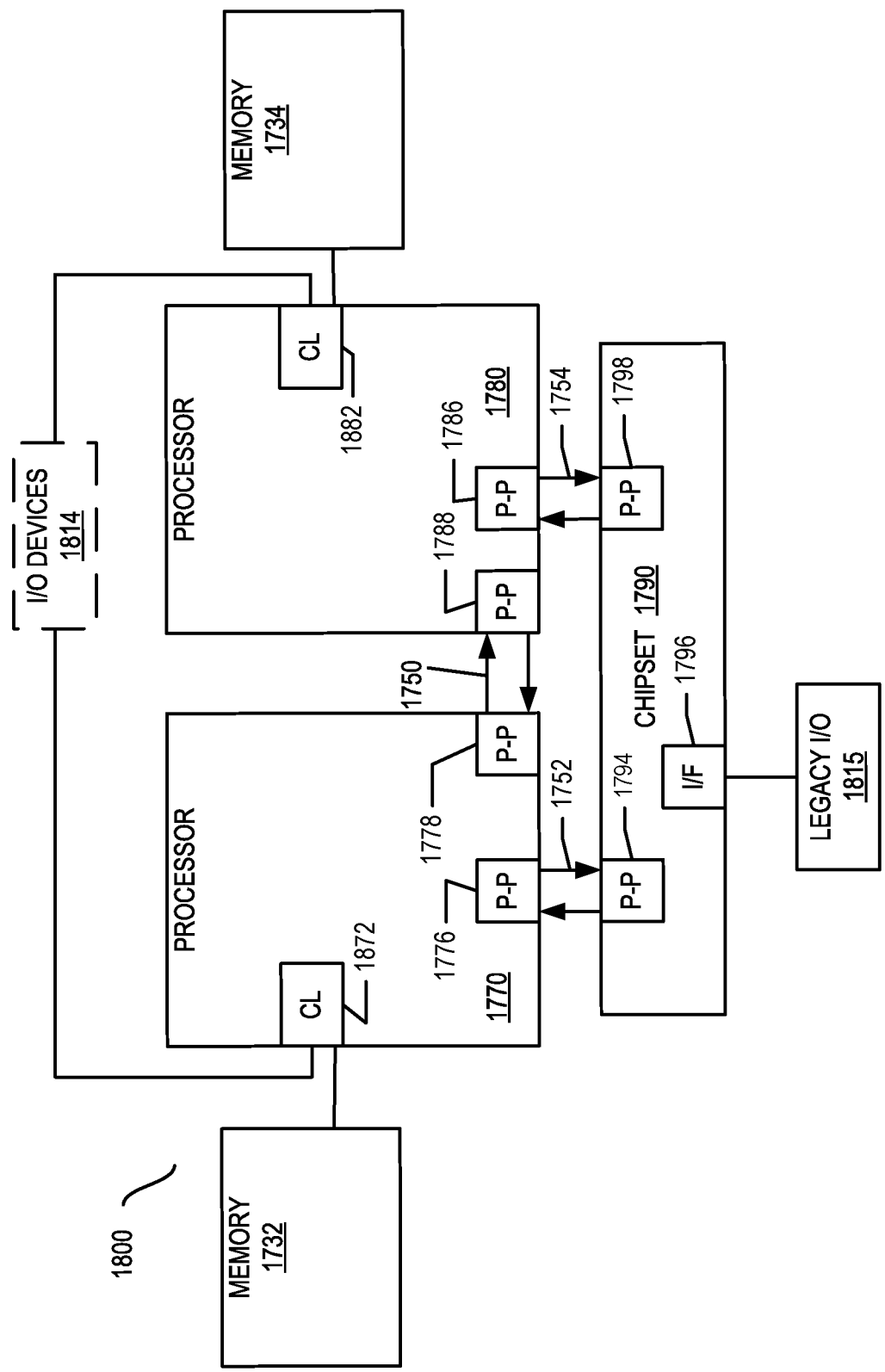

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1872 and 1882, respectively. Thus, the CL 1872, 1882 include integrated memory controller units and include I/O control logic. FIG. 18 illustrates that not only are the memories 1732, 1734 coupled to the CL 1872, 1882, but also that I/O devices 1814 are also coupled to the control logic 1872, 1882. Legacy I/O devices 1815 are coupled to the chipset 1790.

Figure 19:
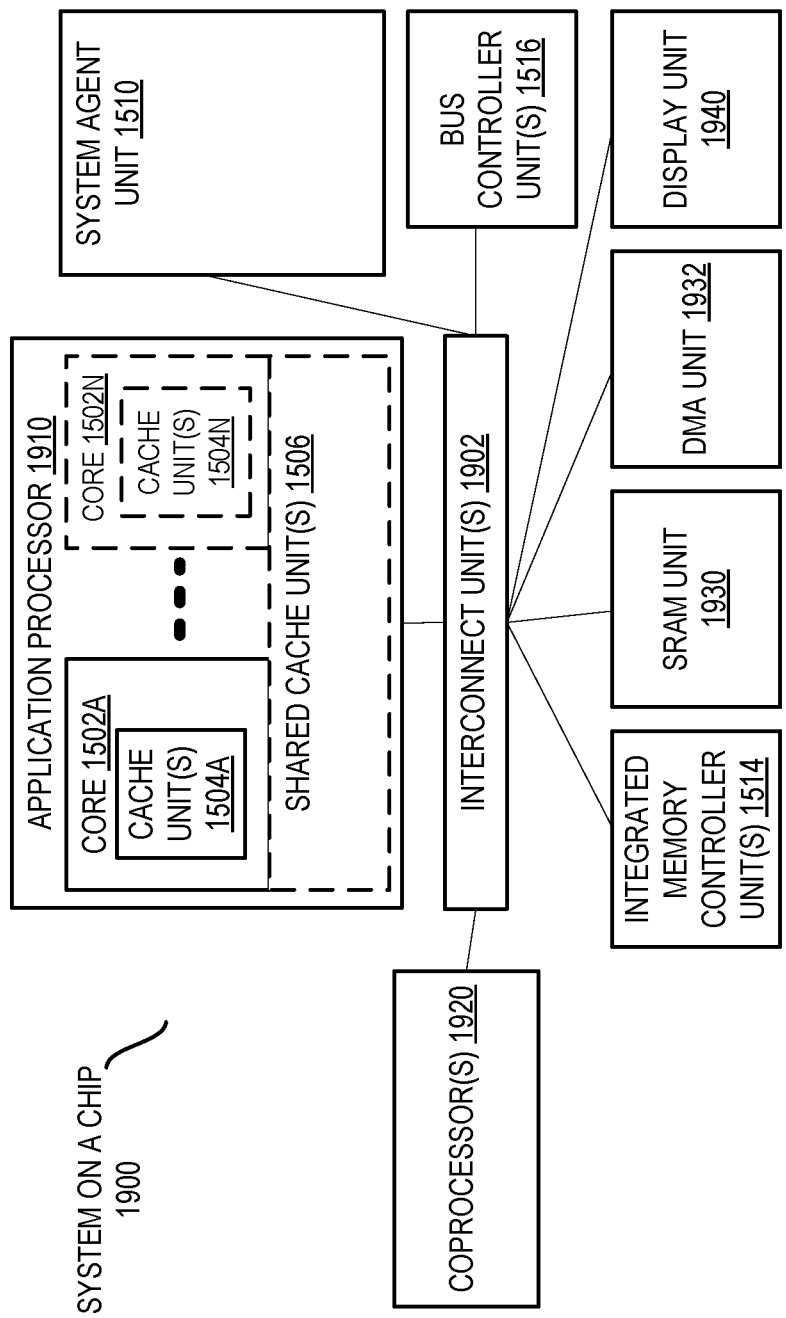

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N, which include cache units 1504A-N, and shared cache unit(s) 1506; a system agent unit 1510; a bus controller unit(s) 1516; an integrated memory controller unit(s) 1514; a set of one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
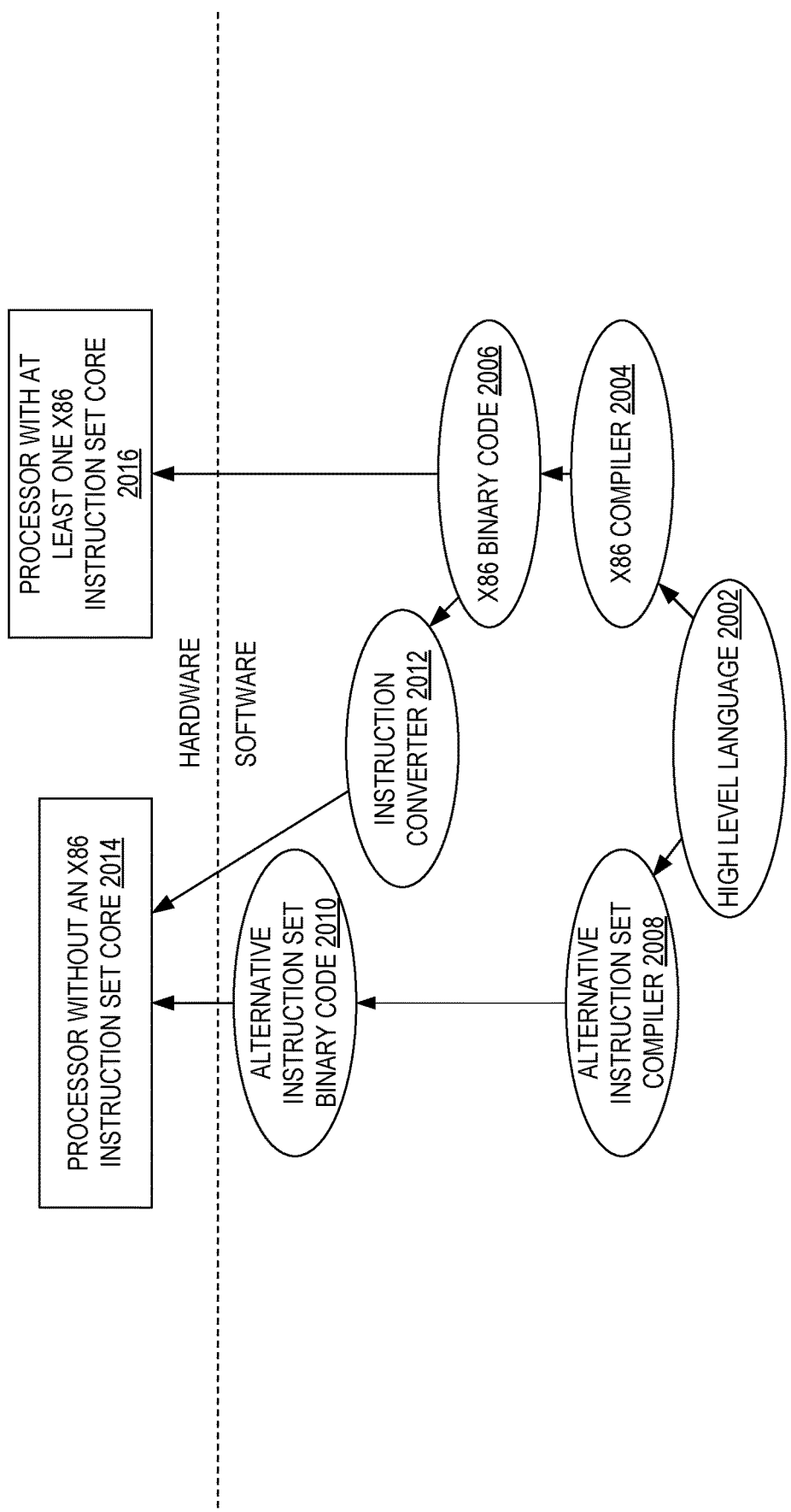
FIG. 20 is a block diagram contrasting the use of a software instruction converter to convert binary instructions in a source instruction set to binary instructions in a target instruction set according to some embodiments.

FIG. 20 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation, or any other process, allows a processor or other electronic device that does not have an x86 instruction set processor or core to execute the x86 binary code 2006.

Further Examples

Example 1 provides an exemplary system comprising: memory; a common request tracker (CRT) to store memory request addresses and data; and a memory controller to: receive a shared read request (SRR) when a first core is not yet identified; allocate a CRT entry and store the SRR therein, mark it as first; and set a share distance to one; send a read request to a memory address indicated by the SRR; and when read data returns from the memory, store the read data in the CRT entry, send the read data to the first core, and await receipt, unless already received, of another SRR from a second core, the other SRR having a same address as the SRR; then, send the read data to the second core; and deallocate the CRT entry.

Example 2 includes the substance of the exemplary system of Example 1, wherein the memory controller is further to: receive a new SRR; search the CRT to identify an existing CRT entry holding an SRR having a same address as the new SRR, the existing CRT entry having been marked as first; store the new SRR in a new CRT entry and mark it as a second SRR;

when read data returns for the existing CRT entry, send the read data to the second core; and deallocate the CRT entry being used by the new SRR.

Example 3 includes the substance of the exemplary system of Example 1, wherein the memory controller is further to receive one or more additional SRRs from the first core, allocate one or more additional CRT entries in which to store the one or more additional SRRs, marking each entry as the first, incrementing a share distance upon storing each of the one or more additional SRRs, sending one or more read requests to the memory corresponding to the one or more SRRs, when read data returns from the memory, send the read data to the first, and upon receipt of one or more SRRs from the second core to the same locations as the one or more SRRs, sending the read data to the second core, and deallocating the one or more CRT entries.

Example 4 includes the substance of the exemplary system of Example 1, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

Example 5 includes the substance of the exemplary system of Example 1, wherein the memory controller, when longer than a threshold amount of clock cycles elapses while awaiting receipt of the SRR from the second to the same address as the SRR from the first, is to issue a fault and reset the CRT.

Example 6 includes the substance of the exemplary system of Example 1, wherein the first and second cores operate independently, the second core sometimes becoming the first core.

Example 7 includes the substance of the exemplary system of Example 1, wherein the memory controller is further to receive one or more additional SRRs from the first core, and when the memory controller receives one or more SRRs from the second core having a different order than the one or more additional first SRRs, the memory controller is to issue a fault and reset the CRT.

Example 8 provides an exemplary method to be performed by a memory controller in a system comprising a memory, a plurality of cores to send read and write requests to the memory controller, and a common request tracker (CRT) to store memory request addresses and data, the method comprising: receiving a shared read request (SRR) when a first core is not yet identified; allocating a CRT entry and storing the SRR therein, marking it as a first, and setting a share distance to one; sending a read request to a memory address indicated by the SRR; when read data returns from the memory, storing the read data in the CRT entry, sending the read data to the first core, and awaiting receipt, unless already received, of another SRR from a second core to a same address as the SRR; then, sending the read data to the second core; and deallocating the CRT entry being used by the SRR.

Example 9 includes the substance of the exemplary method of Example 8, further comprising: receiving a new SRR; searching the CRT to identify an existing CRT entry holding an SRR having a same address as the new SRR, the existing CRT entry having been marked as first; storing the new SRR in a new CRT entry and marking it as a second SRR; when read data returns for the existing CRT entry, sending the read data to the second core; and deallocating the CRT entry being used by the new SRR.

Example 10 includes the substance of the exemplary method of Example 8, further comprising receiving one or more additional SRRs from the first core, allocating one or more additional CRT entries into which to store the one or more additional SRRs, marking each entry as the first, incrementing a share distance upon storing each of the one or more additional SRRs, sending one or more read requests to the memory corresponding to the one or more SRRs, when read data returns from the memory, sending the read data to the first, and upon receipt of one or more second SRRs to the same locations as the one or more first SRRs, sending the read data to the second, and deallocating the one or more additional CRT entries.

Example 11 includes the substance of the exemplary method of Example 8, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

Example 12 includes the substance of the exemplary method of Example 8, wherein the memory controller when longer than a threshold amount of clock cycles elapses while awaiting receipt of the second SRR to the same address as the first SRR, is to issue a fault and reset the CRT.

Example 13 includes the substance of the exemplary method of Example 8, wherein the first and second cores operate independently, the second core sometimes becoming the first core.

Example 14 includes the substance of the exemplary method of Example 8, wherein the memory controller is further to receive one or more additional SRRs from the first core, and when the memory controller receives one or more SRRs from the second core having a different order than the one or more additional first SRRs, the memory controller is to issue a fault and reset the CRT.

Example 15 provides an exemplary non-transitory machine-readable medium having instructions stored thereon to which a memory controller in a system comprising a memory, a plurality of cores to send read and write requests to the memory controller, and a common request tracker (CRT) to store memory request addresses and data, is to respond by: receiving a shared read request (SRR) when a first core is not yet identified; allocating CRT entry and storing the SRR therein, marking it as a first, and setting a share distance to one; sending a read request to a memory address indicated by the SRR; when read data returns from the memory, storing the read data in the CRT entry, sending the read data to the first core, and awaiting receipt, unless already received, of another SRR from a second core to a same address as the SRR; then, sending the read data to the second core; and deallocating the CRT entry being used by the SRR.

Example 16 includes the substance of the exemplary non-transitory machine-readable medium of Example 15, further comprising: receiving a new SRR; searching the CRT to identify an existing CRT entry holding an SRR having a same address as the new SRR, the existing CRT entry having been marked as first; storing the new SRR in a new CRT entry and marking it as a second SRR; when read data returns for the existing CRT entry, sending the read data to the second core; and deallocating the CRT entry being used by the new SRR.

Example 17 includes the substance of the exemplary non-transitory machine-readable medium of Example 15, further comprising receiving one or more additional SRRs from the first core, allocating one or more additional CRT entries into which to store the one or more additional SRRs, marking each entry as the first, incrementing a share distance upon storing each of the one or more additional SRRs, sending one or more read requests to the memory corresponding to the one or more SRRs, when read data returns from the memory, sending the read data to the first, and upon receipt of one or more second SRRs to the same locations as the one or more first SRRs, sending the read data to the second, and deallocating the one or more additional CRT entries.

Example 18 includes the substance of the exemplary non-transitory machine-readable medium of Example 15, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

Example 19 includes the substance of the exemplary non-transitory machine-readable medium of Example 15, wherein the memory controller when longer than a threshold amount of clock cycles elapses while awaiting receipt of the second SRR to the same address as the first SRR, is to issue a fault and reset the CRT.

Example 20 includes the substance of the exemplary non-transitory machine-readable medium of Example 15, wherein the first and second cores operate independently, the second core sometimes becoming the first core.

What is claimed is:

1. A system comprising:
   memory to store data;
   memory to store a common request tracker (CRT) to store memory request addresses and data; and
   a memory controller to:
   receive a shared read request (SRR) when a first core is not yet identified;
   allocate a CRT entry and store the SRR therein, mark it as first; and set a share distance to one;
   send a read request to a memory address indicated by the SRR;
   when read data returns from the memory, store the read data in the CRT entry, send the read data to the first core, and await receipt, unless already received, of another SRR from a second core, the other SRR having a same address as the SRR;
   then, send the read data to the second core; and
   deallocate the CRT entry,
   wherein when a longer than a threshold amount of clock cycles elapses while awaiting receipt of the SRR from the second to the same address as the SRR from the first, the memory controller is to issue a fault and reset the CRT.

2. The system of claim 1, wherein the memory controller is further to:
   receive a new SRR;
   search the CRT to identify an existing CRT entry holding an SRR having a same address as the new SRR, the existing CRT entry having been marked as first;
   store the new SRR in a new CRT entry and mark it as a second SRR;
   when read data returns for the existing CRT entry, send the read data to the second core; and
   deallocate the CRT entry being used by the new SRR.

3. The system of claim 1, wherein the memory controller is further to receive one or more additional SRRs from the first core, allocate one or more additional CRT entries in which to store the one or more additional SRRs, marking each entry as the first, incrementing a share distance upon storing each of the one or more additional SRRs, sending one or more read requests to the memory corresponding to the one or more SRRs, when read data returns from the memory, send the read data to the first, and upon receipt of one or more SRRs from the second core to the same locations as the one or more SRRs, sending the read data to the second core, and deallocating the one or more CRT entries.

4. The system of claim 1, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

5. The system of claim 1, wherein the first and second cores operate independently, the second core sometimes becoming the first core.

6. The system of claim 1, wherein the memory controller is further to receive one or more additional SRRs from the first core, and when the memory controller receives one or more SRRs from the second core having a different order than the one or more additional first SRRs, the memory controller is to issue a fault and reset the CRT.

7. A method to be performed by a memory controller in a system comprising a memory, a plurality of cores to send read and write requests to the memory controller, and a common request tracker (CRT) to store memory request addresses and data, the method comprising:
   receiving a shared read request (SRR) when a first core is not yet identified;
   allocating a CRT entry and storing the SRR therein, marking it as a first, and setting a share distance to one;
   sending a read request to a memory address indicated by the SRR;
   when read data returns from the memory, storing the read data in the CRT entry, sending the read data to the first core, and awaiting receipt, unless already received, of another SRR from a second core to a same address as the SRR;
   then, sending the read data to the second core;
   deallocating the CRT entry being used by the SRR; and
   when longer than a threshold amount of clock cycles elapses while awaiting receipt of the second SRR to the same address as the first SRR, issuing a fault and resetting the CRT.

8. The method of claim 7, further comprising:
   receiving a new SRR;
   searching the CRT to identify an existing CRT entry holding an SRR having a same address as the new SRR, the existing CRT entry having been marked as first;
   storing the new SRR in a new CRT entry and marking it as a second SRR;
   when read data returns for the existing CRT entry, sending the read data to the second core; and
   deallocating the CRT entry being used by the new SRR.

9. The method of claim 7, further comprising receiving one or more additional SRRs from the first core, allocating one or more additional CRT entries into which to store the one or more additional SRRs, marking each entry as the first, incrementing a share distance upon storing each of the one or more additional SRRs, sending one or more read requests to the memory corresponding to the one or more SRRs, when read data returns from the memory, sending the read data to the first, and upon receipt of one or more second SRRs to the same locations as the one or more first SRRs, sending the read data to the second, and deallocating the one or more additional CRT entries.

10. The method of claim 7, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

11. The method of claim 7, wherein the first and second cores operate independently, the second core sometimes becoming the first core.

12. The method of claim 7, wherein the memory controller is further to receive one or more additional SRRs from the first core, and when the memory controller receives one or more SRRs from the second core having a different order than the one or more additional first SRRs, the memory controller is to issue a fault and reset the CRT.

13. A non-transitory machine-readable medium having instructions stored thereon to which a memory controller in a system comprising a memory, a plurality of cores to send read and write requests to the memory controller, and a common request tracker (CRT) to store memory request addresses and data, is to respond by:
receiving a shared read request (SRR) when a first core is not yet identified;
allocating CRT entry and storing the SRR therein, marking it as a first, and setting a share distance to one;
sending a read request to a memory address indicated by the SRR;
when read data returns from the memory, storing the read data in the CRT entry, sending the read data to the first core, and awaiting receipt, unless already received, of another SRR from a second core to a same address as the SRR;
then, sending the read data to the second core;
deallocating the CRT entry being used by the SRR; and
when longer than a threshold amount of clock cycles elapses while awaiting receipt of the second SRR to the same address as the first SRR, issuing a fault and resetting the CRT.

14. The non-transitory machine-readable medium of claim 13, further comprising:
receiving a new SRR;
searching the CRT to identify an existing CRT entry holding an SRR having a same address as the new SRR, the existing CRT entry having been marked as first;
storing the new SRR in a new CRT entry and marking it as a second SRR;
when read data returns for the existing CRT entry, sending the read data to the second core; and deallocating the CRT entry being used by the new SRR.

15. The non-transitory machine-readable medium of claim 13, further comprising receiving one or more additional SRRs from the first core, allocating one or more additional CRT entries into which to store the one or more additional SRRs, marking each entry as the first, incrementing a share distance upon storing each of the one or more additional SRRs, sending one or more read requests to the memory corresponding to the one or more SRRs, when read data returns from the memory, sending the read data to the first, and upon receipt of one or more second SRRs to the same locations as the one or more first SRRs, sending the read data to the second, and deallocating the one or more additional CRT entries.

16. The non-transitory machine-readable medium of claim 13, wherein the memory controller is further to receive one or more additional SRRs from the first core, incrementing the share distance upon storing each of the one or more additional SRRs, until a maximum share distance is reached, at which point the memory controller is to lock the first core from sending any more SRRs.

17. The non-transitory machine-readable medium of claim 13, wherein the first and second cores operate independently, the second core sometimes becoming the first core.

* * * * *